(12) United States Patent
Ausen et al.

(10) Patent No.: US 12,017,396 B2
(45) Date of Patent: Jun. 25, 2024

(54) COEXTRUDED POLYMERIC ARTICLE AND METHOD OF MAKING THE SAME

(71) Applicant: 3M INNOVATIVE PROPERTIES COMPANY, St. Paul, MN (US)

(72) Inventors: Ronald W. Ausen, St. Paul, MN (US); Thomas P. Hanschen, Mendota Heights, MN (US); William J. Kopecky, Hudson, WI (US); Vasav Sahni, St. Paul, MN (US); Ramasubramani Kuduva Raman Thanumoorthy, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 983 days.

(21) Appl. No.: 16/970,518

(22) PCT Filed: Feb. 25, 2019

(86) PCT No.: PCT/IB2019/051505
§ 371 (c)(1),
(2) Date: Aug. 17, 2020

(87) PCT Pub. No.: WO2019/166935
PCT Pub. Date: Sep. 6, 2019

(65) Prior Publication Data
US 2021/0078233 A1 Mar. 18, 2021

Related U.S. Application Data

(60) Provisional application No. 62/636,285, filed on Feb. 28, 2018.

(51) Int. Cl.
*B29C 48/12* (2019.01)
*B29C 48/08* (2019.01)
(Continued)

(52) U.S. Cl.
CPC ............. *B29C 48/12* (2019.02); *B29C 48/08* (2019.02); *B29C 48/21* (2019.02); *B29C 48/307* (2019.02);
(Continued)

(58) Field of Classification Search
CPC ......... B29C 48/12; B29C 48/08; B29C 48/49; B29C 48/21; B29C 48/307; B29K 2105/0097
(Continued)

(56) References Cited

U.S. PATENT DOCUMENTS 4,083,914 A 4/1978 Schippers
4,894,060 A 1/1990 Nestegard
(Continued)

FOREIGN PATENT DOCUMENTS

EP 0343896 11/1989
EP 1918026 5/2008
(Continued)

OTHER PUBLICATIONS

Atomic Filters, size information for standard HVAC filters, Kevin King, 2017 https://atomicfilters.com/blogs/news/complete-list-of-furnace-filter-sizes-with-actual-size-and-merv-ratings-available (Year: 2017).*

(Continued)

*Primary Examiner* — Alison L Hindenlang
*Assistant Examiner* — Erica Hartsell Funk
(74) *Attorney, Agent, or Firm* — Thomas M. Spielbauer

(57) ABSTRACT

Coextended polymeric article comprising a layer comprising first and second opposed major surfaces, wherein a plurality of attached projection pairs comprising first and second projections extend from only the first major surface (i.e., the second major surface is free of any projections), wherein each first projection has at least first and second opposed (Continued)

sides and a height from the first major surface to a distal end, wherein each first projection has at least first and second opposed sides and a height from the first major surface to a distal end. Uses for coextruded polymeric articles described herein include adhesive articles and household cleaning products (e.g., a mop, a duster, a brush, a cleaning cloth, or a lint roller).

15 Claims, 11 Drawing Sheets

(51) Int. Cl.
 *B29C 48/21* (2019.01)
 *B29C 48/305* (2019.01)
 *B29C 48/49* (2019.01)
 *B29K 105/00* (2006.01)
(52) U.S. Cl.
 CPC ...... *B29C 48/49* (2019.02); *B29K 2105/0097* (2013.01)
(58) Field of Classification Search
 USPC .................................................... 264/173.16
 See application file for complete search history.

(56) References Cited

U.S. PATENT DOCUMENTS

| | | |
|---|---|---|
| 5,080,957 A | 1/1992 | Leseman |
| 5,112,882 A | 5/1992 | Babu |
| 5,145,544 A | 9/1992 | Leseman |
| 5,194,299 A | 3/1993 | Fry |
| 5,209,971 A | 5/1993 | Babu |
| 5,268,228 A | 12/1993 | Orr |
| 5,354,591 A | 10/1994 | Ott |
| 5,405,675 A | 4/1995 | Sawka |
| 5,407,970 A | 4/1995 | Peterson |
| 5,644,007 A | 7/1997 | Davidson |
| 5,650,215 A | 7/1997 | Mazurek |
| 5,681,302 A | 10/1997 | Melbye |
| 5,699,593 A | 12/1997 | Jackson |
| 5,830,298 A | 11/1998 | Jackson |
| 6,106,922 A | 8/2000 | Cejka |
| 6,123,890 A | 9/2000 | Mazurek |
| 6,197,397 B1 | 3/2001 | Sher |
| 6,206,885 B1 | 3/2001 | Ghahremani |
| 6,315,851 B1 | 11/2001 | Mazurek |
| 6,436,218 B2 | 8/2002 | Sher |
| 6,489,003 B1 | 12/2002 | Levitt |
| 6,524,675 B1 | 2/2003 | Mikami |
| 6,531,206 B2 | 3/2003 | Johnston |
| 6,656,567 B1 | 12/2003 | Abe |
| 6,814,912 B2 | 11/2004 | Ausen |
| 6,982,055 B2 | 1/2006 | Seth |
| 7,007,351 B2 | 3/2006 | Ausen |
| 7,052,636 B2 | 5/2006 | Ausen |
| 7,182,992 B2 | 2/2007 | Ausen |
| 7,185,401 B2 | 3/2007 | Ausen |
| 7,467,873 B2 | 12/2008 | Clarke |
| 7,622,180 B2 | 11/2009 | Seth |
| 7,678,316 B2 | 3/2010 | Ausen |
| 7,765,651 B2 | 8/2010 | Seth |
| 7,797,081 B2 | 9/2010 | DeMarco |
| 7,897,081 B2 | 3/2011 | Ausen |
| 7,968,172 B2 | 6/2011 | Ausen |
| 9,724,865 B2 | 8/2017 | Ausen |
| 2003/0015819 A1 | 1/2003 | Levitt |
| 2003/0087059 A1 | 5/2003 | Jackson |
| 2003/0124293 A1 | 7/2003 | Sher |
| 2003/0145440 A1 | 8/2003 | Ausen |
| 2003/0178124 A1 | 9/2003 | Mikami |
| 2003/0182776 A1 | 10/2003 | Ausen |
| 2003/0211281 A1 | 11/2003 | Franke |
| 2004/0023049 A1* | 2/2004 | Fujita ..................... B32B 27/34 428/474.7 |
| 2005/0101926 A1 | 5/2005 | Ausen |
| 2005/0127541 A1 | 6/2005 | Spurgeon |
| 2006/0113699 A1 | 6/2006 | Ausen |
| 2006/0188704 A1 | 8/2006 | Mikami |
| 2007/0110953 A1 | 5/2007 | Ausen |
| 2007/0154683 A1 | 7/2007 | Ausen |
| 2008/0078500 A1* | 4/2008 | Sher ......................... B32B 7/06 156/289 |
| 2008/0099951 A1 | 5/2008 | Batch |
| 2008/0105356 A1 | 5/2008 | Mikami |
| 2010/0025881 A1 | 2/2010 | Seth |
| 2011/0268906 A1 | 11/2011 | Ausen |
| 2012/0052245 A1 | 3/2012 | Hoium |
| 2012/0098156 A1 | 4/2012 | Ausen |
| 2012/0308755 A1 | 12/2012 | Gorman |
| 2014/0220328 A1 | 8/2014 | Ausen |
| 2017/0008242 A1 | 1/2017 | Legatt |
| 2017/0065923 A1 | 3/2017 | Fox |
| 2017/0066210 A1 | 3/2017 | Wood |
| 2017/0305055 A1 | 10/2017 | Ausen |

FOREIGN PATENT DOCUMENTS

| | | |
|---|---|---|
| GB | 2495629 | 4/2013 |
| JP | 57163546 | 10/1982 |
| WO | WO 1992-001401 | 2/1992 |
| WO | WO 1995-016754 | 6/1995 |
| WO | WO 1999-017631 | 4/1999 |
| WO | WO 2003-059108 | 7/2003 |
| WO | WO 2004-093591 | 11/2004 |
| WO | WO 2010-099148 | 9/2010 |
| WO | WO 2011-097436 | 8/2011 |
| WO | WO 2011-119323 | 9/2011 |
| WO | WO 2015-130934 | 9/2015 |
| WO | WO 2016-191650 | 12/2016 |
| WO | WO 2019-142089 | 7/2019 |
| WO | WO 2019-166936 | 9/2019 |

OTHER PUBLICATIONS

International Search Report for PCT International Application No. PCT/IB2019/051505, mailed on Jun. 13, 2019, 6 pages.

* cited by examiner

COEXTRUDED POLYMERIC ARTICLE AND METHOD OF MAKING THE SAME

CROSS REFERENCE TO RELATED APPLICATION

This application claims the benefit of U.S. Provisional Patent Application No. 62/636,285, filed Feb. 28, 2018, the disclosure of which is incorporated by reference herein in its entirety.

BACKGROUND

Coextruded polymeric articles (including layers) having projections are known in the art. For example, it is known to provide a co-extruded, layer structures where the layer is partitioned, not as coextensive layers in the thickness direction, but as stripes or strands along the width dimension of the layer. This has sometimes been called "side-by-side" co-extrusion.

There is a need for films with projections where the projections are different than the film layer. These projections can provide second and third type performance as compared to the base film layer.

There is a desire for additional polymeric articles with projections that offer different configurations and/or properties (e.g., adhesive properties) over conventional articles. Some adhesive systems that switch from a state of relatively low or no adhesion to a state of much higher adhesion upon application of a certain trigger (commonly called "adhesion on demand" systems) are known. Many of these systems use triggers such as solvents, ultra violet light, heat, or magnetic forces, to create tiered adhesive performance once or repetitively. These systems are limited in applications for several reasons. For many of these triggers, the adhesive system must contain specific chemical groups, which restricts usage to applications where those chemical groups can be tolerated. These systems can be used only where a particular trigger is available and can be effectively applied to the adhesive system. Further, some triggers are difficult or inconvenient for consumers to use. Certain triggers, as well as the chemical groups in the adhesive that respond to such triggers, can be cost-prohibitive.

There is a continuing desire for new coextruded polymeric article constructions. Further, there is a need for "adhesion on demand" systems where the trigger is applicable to all adhesive chemistries, the trigger is more broadly or even universally available, the trigger is easy to apply, not only industrially, but by a consumer, and the adhesion-on-demand system is not exceedingly expensive.

SUMMARY

In one aspect, the present disclosure describes a first coextruded polymeric article comprising a layer comprising first and second opposed major surfaces, wherein a plurality of attached projection pairs comprising first and second projections extend from only the first major surface (i.e., the second major surface is free of any projections), wherein each first projection has at least first and second opposed sides and a height from the first major surface to a distal end, wherein the height of the first projections is not greater than 2 mm (in some embodiments, not greater than 1.5 mm, or even not greater than 1 mm), and wherein there are at least 2.5 (in some embodiments, at least 5, 10, 15, or even at least 20) projection pairs per centimeter.

In another aspect, the present disclosure describes a method for making the first coextruded polymeric article described herein, the method comprising:

providing an extrusion die comprising a plurality of shims positioned adjacent to one another, the shims together defining a first cavity, a second cavity, a third cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice;

providing via extrusion a first material to the first cavity of the extrusion die, a second material to the second cavity of the extrusion die, and a third material to the third cavity of the extrusion die;

extruding a layer from the distal opening of the die slot; and quenching the extruded layer.

In another aspect, the present disclosure describes a second coextruded polymeric article comprising a layer comprising first and second opposed major surfaces, wherein a plurality of attached projection pairs comprising first and second projections extend from only the first major surface (i.e., the second major surface is free of any projections), wherein each first projection has at least first and second opposed sides and a height from the first major surface to a distal end, wherein a majority by number (i.e., at least 50 percent by number; in some embodiments, at least 55, 60, 65, 70, 75, 80, 85, 90, 95, or even 100 percent) of the projection pairs, the height of the second projection is greater than the height of the attached first projection, and wherein at least one of the first or second projections comprise adhesive.

In another aspect, the present disclosure describes a method for making the second coextruded polymeric article described herein, the method comprising:

providing an extrusion die comprising a plurality of shims positioned adjacent to one another, the shims together defining a first cavity, a second cavity, a third cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice;

providing via extrusion a first material to the first cavity of the extrusion die, a second material to the second cavity of the extrusion die, and a third material to the third cavity of the extrusion die;

extruding a layer from the distal opening of the die slot; and quenching the extruded layer.

In another aspect, the present disclosure describes a third coextruded polymeric article comprising a layer comprising first and second opposed major surfaces, wherein a plurality of attached projection pairs comprising first and second projections extend from only the first major surface (i.e., the second major surface is free of any projections), wherein each first projection has at least first and second opposed sides and a height from the first major surface to a distal end, and wherein there is a demarcation line between the attached projections.

In another aspect, the present disclosure describes a method for making the third coextruded polymeric article described herein, the method comprising:

providing an extrusion die comprising a plurality of shims positioned adjacent to one another, the shims together defining a first cavity, a second cavity, a third cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice;

providing via extrusion a first material to the first cavity of the extrusion die, a second material to the second cavity of the extrusion die, and a third material to the third cavity of the extrusion die;

extruding a layer from the distal opening of the die slot; and quenching the extruded layer.

Embodiments of coextruded polymeric articles described herein can include adhesive articles, household cleaning products (e.g., a mop, a duster, a brush, a cleaning cloth, or a lint roller), and wall attachments.

Embodiments of coextruded polymeric articles described herein can provide a tiered performance, such that for some property of merit (e.g., an adhesive level), the coextruded polymeric article exhibits one level of or value for that property in a base condition or state of use, and at least one different level of or value for that property when in at least one triggered condition or state of use.

DETAILED DESCRIPTION

Figure 1:
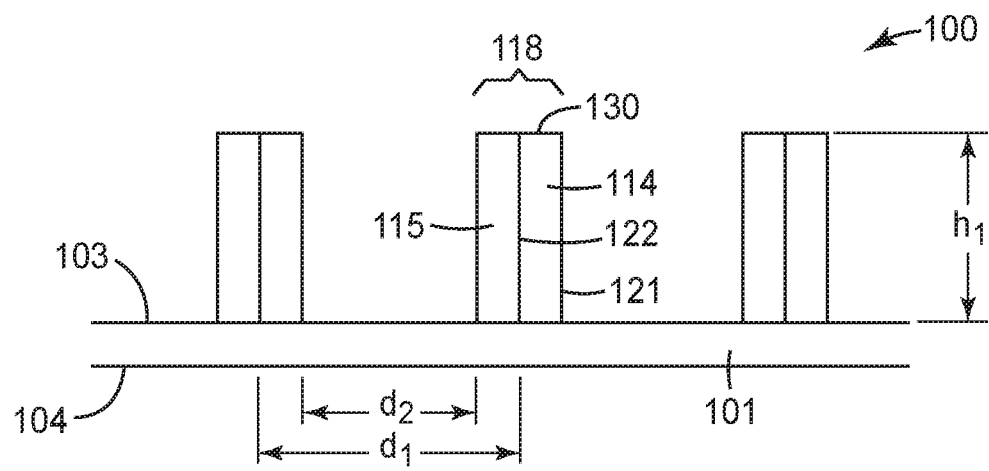
FIG. 1 is a schematic cross-sectional view of an exemplary coextruded polymeric article described herein.

Referring to FIG. 1, exemplary coextruded polymeric article 100 comprises layer 101 comprising first and second opposed major surfaces 103, 104. Plurality of attached projection pairs 118 comprise first and second projections 114, 115 extend from only first major surface 103. Each first projection 114 has at least first and second opposed sides 121, 122 and height, $h_1$, from first major surface 103 to distal end 130. Height, $h_1$, of first projections 114 is not greater than 2 mm. There are at least 2.5 projection pairs per centimeter. Distance, $d_1$, measured from the respective midpoints of two projections, is used to express the number of projections in a given distance. Distance, $d_2$, which is measured from the closest sides of two projections, is used to express the distance between projections.

In some embodiments of the first coextruded polymeric article, the first projections comprise first material, the second projections comprise second material, and the layer comprises a third material. In some embodiments of the first coextruded polymeric article, at least one of the first, second, or third materials comprise adhesive. In some embodiments of the first coextruded polymeric article, at least one of the first, second, or third materials independently comprise at least one of a thermoplastic resin (e.g., at least one of, including copolymers and blends thereof, a polyolefin (e.g., polypropylene and polyethylene), polyvinyl chloride, a polystyrene, nylon, a polyester (e.g., polyethylene terephthalate) or an elastomer (e.g., an ABA block copolymer, a polyurethane, a polyolefin elastomer, a polyurethane elastomer, a metallocene polyolefin elastomer, a polyamide elastomer, an ethylene vinyl acetate elastomer, and a polyester elastomer)). In some embodiments, at least one of the first, second, or third materials of the first coextruded polymeric article described herein independently comprise an adhesive. In some embodiments, at least one of the first, second, or third adhesives of the first coextruded polymeric article described herein are independently at least one of, including copolymers and blends thereof, an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

In some embodiments of the first coextruded polymeric article, the first and second materials are the same. In some embodiments of the first coextruded polymeric article, the first and second materials are different. In some embodiments of the first coextruded polymeric article, the first and third materials are the same. In some embodiments of the first coextruded polymeric article, the first and third materials are the different. In some embodiments of the first coextruded polymeric article, the second and third materials are the same. In some embodiments of the first coextruded polymeric article, the second and third materials are the different. "Different" as used herein means at least one of (a) a difference of at least 2% in at least one infrared peak, (b) a difference of at least 2% in at least one nuclear magnetic resonance peak, (c) a difference of at least 2% in the number average molecular weight, or (d) a difference of at least 5% in polydispersity. Examples of differences in polymeric materials that can provide the difference between polymeric materials include composition, microstructure, color, and refractive index. The term "same" in terms of polymeric materials means not different.

Figure 2:
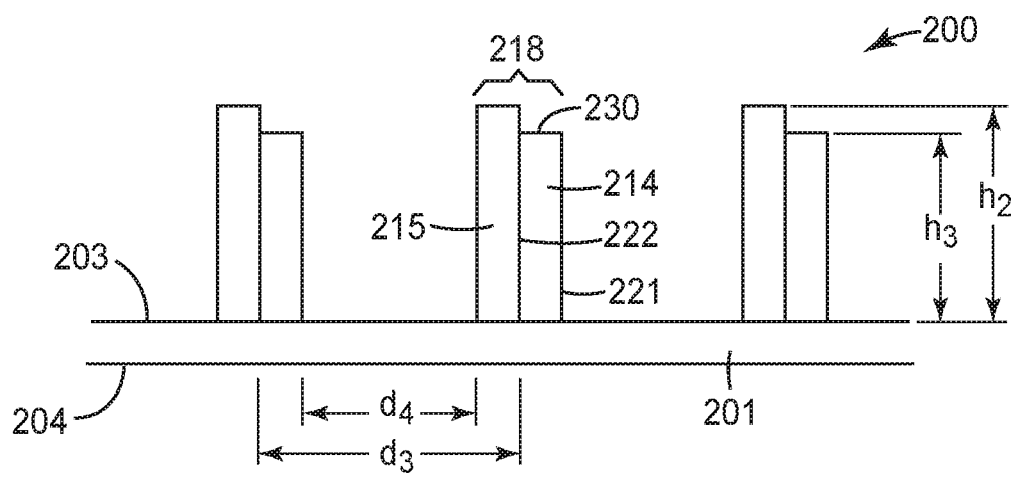
FIG. 2 is a schematic cross-sectional view of another exemplary coextruded polymeric article described herein.

Referring to FIG. 2, exemplary coextruded polymeric article 200 comprising layer 201 comprising first and second opposed major surfaces 203, 204. Plurality of attached projection pairs 218 comprise first and second projections 214, 215 extend from only first major surface 203. Each first projection 214 has at least first and second opposed sides 221, 222 and height, $h_2$, $h_3$, from first major surface 203 to distal end 230. Majority by number of projection pairs 218. Height, $h_2$, of second projection 215 is greater than height, $h_3$, of attached first projection 214. At least one of first or second projections 214, 215 comprise first or second materials, respectively, at least one of which is adhesive. Distance, $d_3$, measured from the respective midpoints of two projections, is used to express the number of projections in a given distance. Distance, $d_4$, which is measured from the closest sides of two projections, is used to express the distance between projections.

In some embodiments of the second coextruded polymeric article, the layer comprises at least one of a thermoplastic resin (e.g., at least one of, including copolymers and blends thereof, a polyolefin (e.g., polypropylene and polyethylene), polyvinyl chloride, a polystyrene, nylon, a polyester (e.g., polyethylene terephthalate) or an elastomer (e.g., an ABA block copolymer, a polyurethane, a polyolefin elastomer, a polyurethane elastomer, a metallocene polyolefin elastomer, a polyamide elastomer, an ethylene vinyl acetate elastomer, and a polyester elastomer)). The layer of the second coextruded polymeric article comprises a third material, wherein in some embodiments, the third materials comprises a third adhesive. In some embodiments, at least one of the first, second, or third adhesives of the first coextruded polymeric article described herein are independently at least one of, including copolymers and blends thereof, an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

In some embodiments of the second coextruded polymeric article, the first and second materials are the same. In some embodiments of the second coextruded polymeric article, the first and second materials are different. In some embodiments of the second coextruded polymeric article, the first and third materials are the same. In some embodiments of the second coextruded polymeric article, the first and third materials are the different. In some embodiments of the second coextruded polymeric article, the second and third materials are the same. In some embodiments of the second coextruded polymeric article, the second and third materials are the different.

Figure 3:
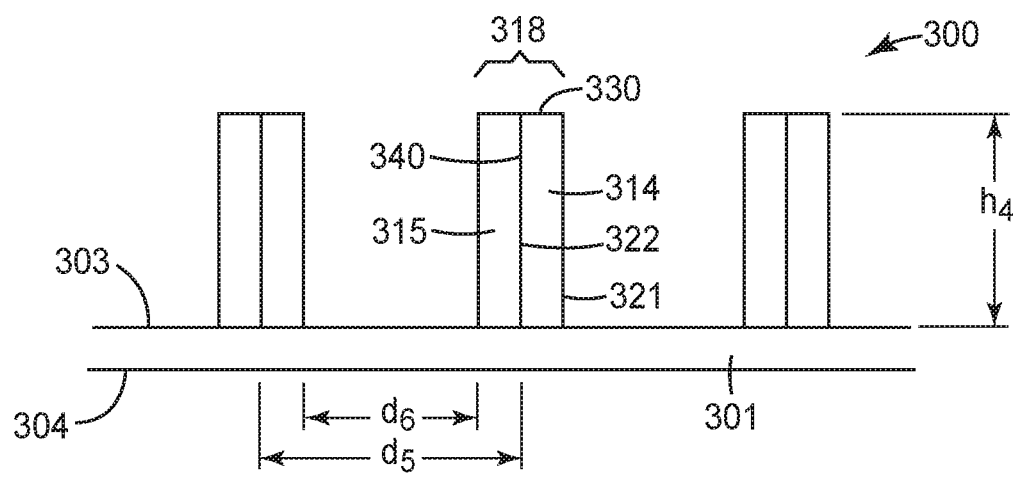
FIG. 3 is a schematic cross-sectional view of another exemplary coextruded polymeric article described herein.

Referring to FIG. 3, exemplary coextruded polymeric article 300 comprises layer 301 comprises first and second opposed major surfaces 303, 304. Plurality of attached projection pairs 318 comprises first and second projections 314, 315 extend from only first major surface 303. Each first projection 314 has at least first and second opposed sides 321, 322 and height, $h_4$, from first major surface 303 to distal end 330. There is demarcation line 340 between attached projections 314, 315. Distance, $d_5$, measured from the respective midpoints of two projections, is used to express the number of projections in a given distance. Distance, $d_6$, which is measured from the closest sides of two projections, is used to express the distance between projections.

In some embodiments of the third coextruded polymeric article, the first projections comprise first material, and the second projections comprise second material, and the layer comprises the third material. In some embodiments of the third coextruded polymeric article, at least one of the first, second, or third materials comprise adhesive. In some embodiments of the third coextruded polymeric article, at least one of the first, second, or third materials independently comprise at least one of a thermoplastic resin (e.g., at least one of, including copolymers and blends thereof, a polyolefin (e.g., polypropylene and polyethylene), polyvinyl chloride, a polystyrene, nylon, a polyester (e.g., polyethylene terephthalate) or an elastomer (e.g., an ABA block copolymer, a polyurethane, a polyolefin elastomer, a polyurethane elastomer, a metallocene polyolefin elastomer, a polyamide elastomer, an ethylene vinyl acetate elastomer, and a polyester elastomer)). In some embodiments, at least one of the first, second, or third materials of the first coextruded polymeric article described herein independently comprise an adhesive. In some embodiments, at least one of the first, second, or third adhesives of the first coextruded polymeric article described herein are independently at least one of, including copolymers and blends thereof, an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

In some embodiments of the third coextruded polymeric article, the first and second materials are the same. In some embodiments of the third coextruded polymeric article, the first and second materials are different. In some embodiments of the third coextruded polymeric article, the first and third materials are the same. In some embodiments of the third coextruded polymeric article, the first and third materials are the different. In some embodiments of the third coextruded polymeric article, the second and third materials are the same. In some embodiments of the third coextruded polymeric article, the second and third materials are the different.

In some embodiments, the first, second, and third coextruded polymeric articles described herein have a (machine direction) length of at least 5 mm (in some embodiments, at least 10 mm, 25 mm, 50 mm, 1 cm, 5 cm, 10 cm, 50 cm, 75 cm, 1 m, 5 m, 10 m, 25 m, 50 m, 100 m, 500 m, or even at least 1000 m). In some embodiments, the protrusions and projections extend along the length of the coextruded polymeric article (i.e., have respective lengths of at least 5 mm (in some embodiments, at least 10 mm, 25 mm, 50 mm, 1 cm, 5 cm, 10 cm, 50 cm, 75 cm, 1 m, 5 m, 10 m, 25 m, 50 m, 100 m, 500 m, or even at least 1000 m)).

In some embodiments, connected projections have a demarcation line therebetween. This construction can be formed by methods described herein where materials are coextruded in a manner that results in a distinct line of orientation visible at the polymer boundary between connected projections. This demarcation line or boundary region between connected projections can be detected using Differential Scanning calorimetry. Comparing by temperature modulated differential scanning calorimetry a region containing mostly a demarcation line (Region 1) versus a region that does not substantially contain material from the demarcation line (Region 2) a difference in heat flow/heat capacity is observed that is believed to be consistent with an energy release or reduction in molecular orientation/internal stress. That is, although not wanting to be bound by theory, it is believed that the thermal signatures of the regions may be a combination of material thermal transitions and the material response to retained thermal/processing history. In some embodiments, there is a demarcation line between the layer and at least the first of second projections.

In another aspect, the present disclosure describes a method for making the first coextruded polymeric article described herein, the method comprising:

providing an extrusion die comprising a plurality of shims positioned adjacent to one another, the shims together defining a first cavity, a second cavity, a third cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice;

providing via extrusion a first material to the first cavity of the extrusion die, a second material to the second cavity of the extrusion die, and a third material to the third cavity of the extrusion die;

extruding a layer from the distal opening of the die slot; and quenching the extruded layer.

In another aspect, the present disclosure describes a method for making the second coextruded polymeric article described herein, the method comprising:

providing an extrusion die comprising a plurality of shims positioned adjacent to one another, the shims together defining a first cavity, a second cavity, a third cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice;

providing via extrusion a first material to the first cavity of the extrusion die, a second material to the second cavity of the extrusion die, and a third material to the third cavity of the extrusion die;

extruding a layer from the distal opening of the die slot; and quenching the extruded layer.

In another aspect, the present disclosure describes a method for making the third coextruded polymeric article described herein, the method comprising:

providing an extrusion die comprising a plurality of shims positioned adjacent to one another, the shims together defining a first cavity, a second cavity, a third cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice;

providing via extrusion a first material to the first cavity of the extrusion die, a second material to the second cavity of the extrusion die, and a third material to the third cavity of the extrusion die;

extruding a layer from the distal opening of the die slot; and quenching the extruded layer.

Coextruded polymeric articles described herein (including those shown in FIGS. 1, 2 and 3), each of the layer, respective first projections, and respective second projections may be considered monolithic (i.e., having a generally uniform composition) and are not fibrous. The projection material does not pass into the layer, but, is rather bonded to one side of the layer, and thus, the layer is a continuous formation of a single material. This is accomplished by formation of weld lines, called demarcation lines at the die region where the dispensing orifices merge together at the distal opening. Further, the projections are not nonwoven materials, nor are they coated or added via as a secondary step. In some embodiments described below, however, portions of the articles may be apertured. Typically, the projections are co-extruded and melt bonded together to form coextruded, continuous, polymeric articles with projections formed together as a pair. Referring again to FIG. 1, coextruded polymeric article 100 can be prepared, for example, by extrusion from a die having a variety of passageways from cavities within the die to a dispensing slot, including exemplary dies described herein (see, e.g., FIG. 4). The die may conveniently be comprised of a plurality of shims. In some embodiments a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice.

In some embodiments, the shims will be assembled according to a plan that provides a sequence of shims of diverse types. Since different applications may have different requirements, the sequences can have diverse numbers of shims. The sequence may be a repeating sequence that is not limited to a particular number of repeats in a particular zone. Or the sequence may not regularly repeat, but different sequences of shims may be used. The shape of the passageways within, for example, a sequence of shims, may be identical or different. Examples of passageway cross-sectional shapes include round, square, and rectangular shapes. In some embodiments, the shims that provide a passageway between one cavity and the dispensing slot might have a flow restriction compared to the shims that provide a passageway between another cavity and the dispensing slot. The width of the distal opening within, for example, a different sequence of shims, may be identical or different. For example, the portion of the distal opening provided by the shims that provide a passageway between one cavity and the dispensing slot could be narrower than the portion of the distal opening provided by the shims that provide a passageway between another cavity and the dispensing slot. In general, the distal opening to create the projections is much longer than the distal opening to create the layer.

Individual cavities and passageways provide a conduit for polymer to orifices to create the layer and protrusions. These individual flow streams merge together to form a continuous, solid coextruded polymeric article, at the die slot portion of the die. Spacer shims provide connecting slots to form demarcation lines connecting the layer and projections.

In some embodiments, extrusion dies described herein include a pair of end blocks for supporting the plurality of shims. In these embodiments, it may be convenient for one, or even all, of the shims to each have at least one throughholes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one, or both, of the cavities.

In some embodiments, the shims will be assembled according to a plan that provides a repeating sequence of shims of diverse types. The repeating sequence can have diverse numbers of shims per repeat. For a first example, repeating sequence of five shim patterns is described below to create the orifice pattern shown in FIG. 4 to create the coextruded polymeric article shown in FIG. 1. When that five-shim repeating sequence is properly provided with molten polymer, it extrudes a continuous film through the die slot to create the coextruded polymeric article with the layer and projections.

In some embodiments, the assembled shims (conveniently bolted between the end blocks) further comprise a manifold body for supporting the shims. The manifold body has at least one (e.g., in some embodiments, at least two, three, four, or more) manifold therein, the manifold having an outlet. An expansion seal (e.g., made of copper or alloys thereof) is disposed to seal the manifold body and the shims, such that the expansion seal defines a portion of at least one of the cavities (in some embodiments, at least a portion of both the first and second cavities), and such that the expansion seal allows a conduit between the manifold and the cavity.

Typically, the passageway between cavity and dispensing orifice is up to 5 mm in length. Sometimes the fluid passageways leading to one array has greater fluid restriction than the fluid passageways leading to one or more of the other arrays.

The shims for dies described herein typically have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways, several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. To aid in alignment, an alignment key can be cut into the shims. Also, a vibrating table can be useful to provide a smooth surface alignment of the extrusion tip.

In practicing methods described herein, the polymeric materials might be solidified simply by cooling. This can be conveniently accomplished passively by ambient air, or actively, for example, by quenching the extruded polymeric materials on a chilled surface (e.g., a chilled roll). In some embodiments, the first and/or second and/or third polymeric materials are low molecular weight polymers that need to be cross-linked to be solidified, which can be done, for example, by electromagnetic or particle radiation. In some embodiments, it is desirable to maximize the quenching time to increase the bond strength.

Figure 4:
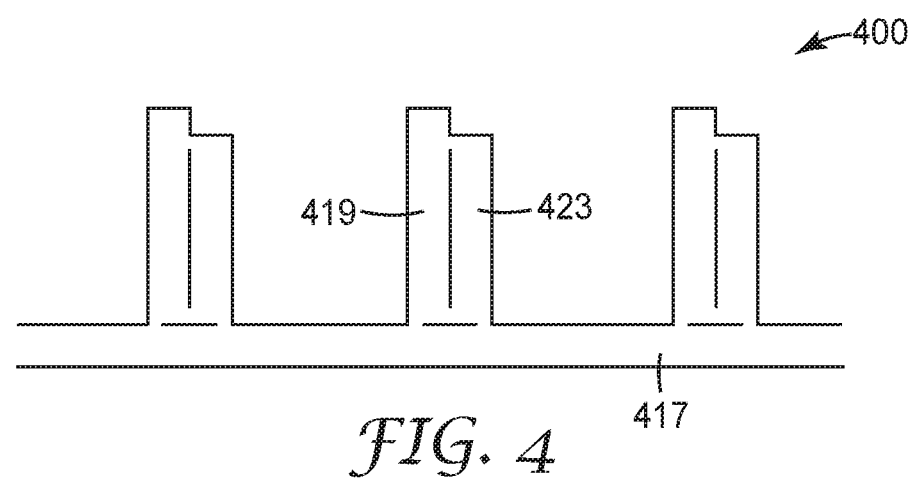
FIG. 4 is a schematic cross-sectional view of an exemplary die cavity pattern just upstream from the distal opening of the die employed in the formation of an exemplary coextruded polymeric article described herein.

FIG. 4 is a schematic cross-sectional view of an exemplary die orifice pattern just upstream from the dispensing slot of the die employed in the formation of an exemplary coextruded polymeric article described herein. Orifice plan 400 shows first orifices 423, second orifices 419, and third orifices 417. As will be described in detail later, the orifices are spaced apart to provide passageway sidewalls between passageways. The individual flowstreams are merged together, with demarcation lines to form a continuous coextruded polymeric article in the final slot orifice of the die, not shown. The demarcation lines are created at orifices separated by a minimal amount, by spacer shims. These shims typically have thicknesses in a range from 50 to 200 micrometers. The depth of the final slot is long enough, and the distance between the orifices are close, such that a continuous article, a created sum of all orifices, is formed within the final slot of the die.

Figure 5A:
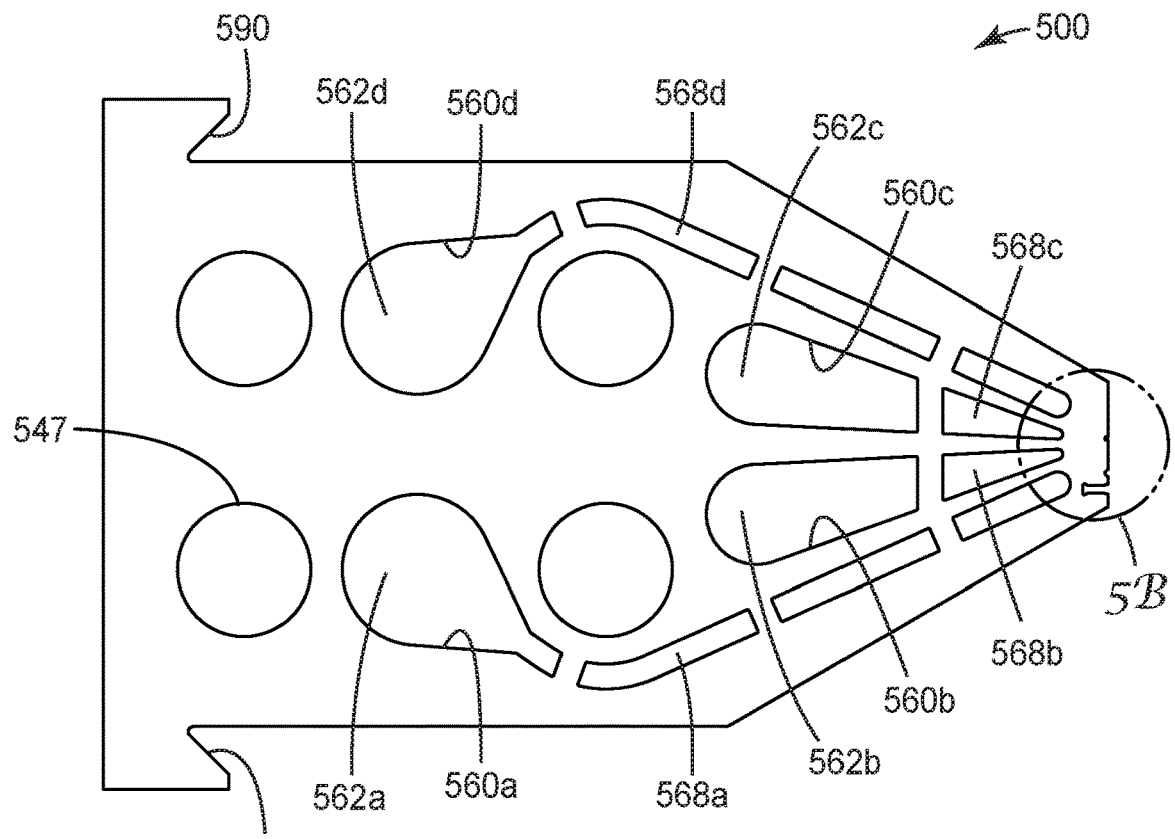
FIG. 5A is a plan view of an exemplary embodiment of a shim suited to form a sequence of shims capable of forming an exemplary coextruded polymeric article, for example, as shown in the schematic cross-sectional views of FIGS. 1 and 2.
Figure 5B:
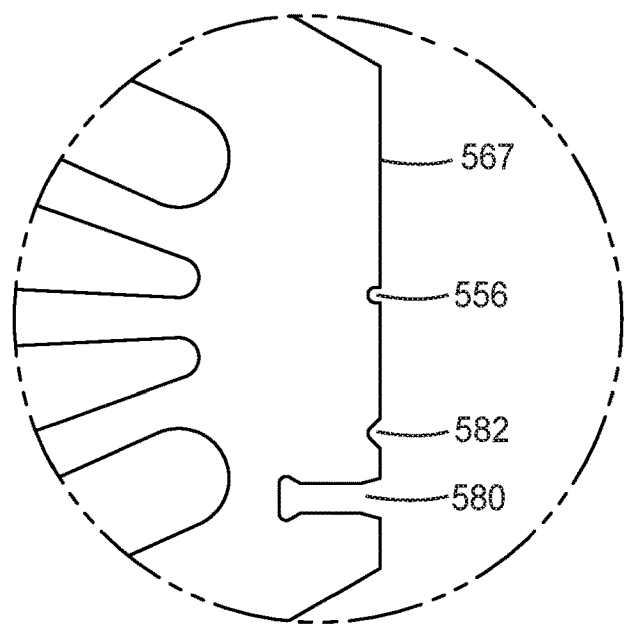
FIG. 5B is an expanded region near the dispensing surface of the shim shown in FIG. 5A.
Figure 10:
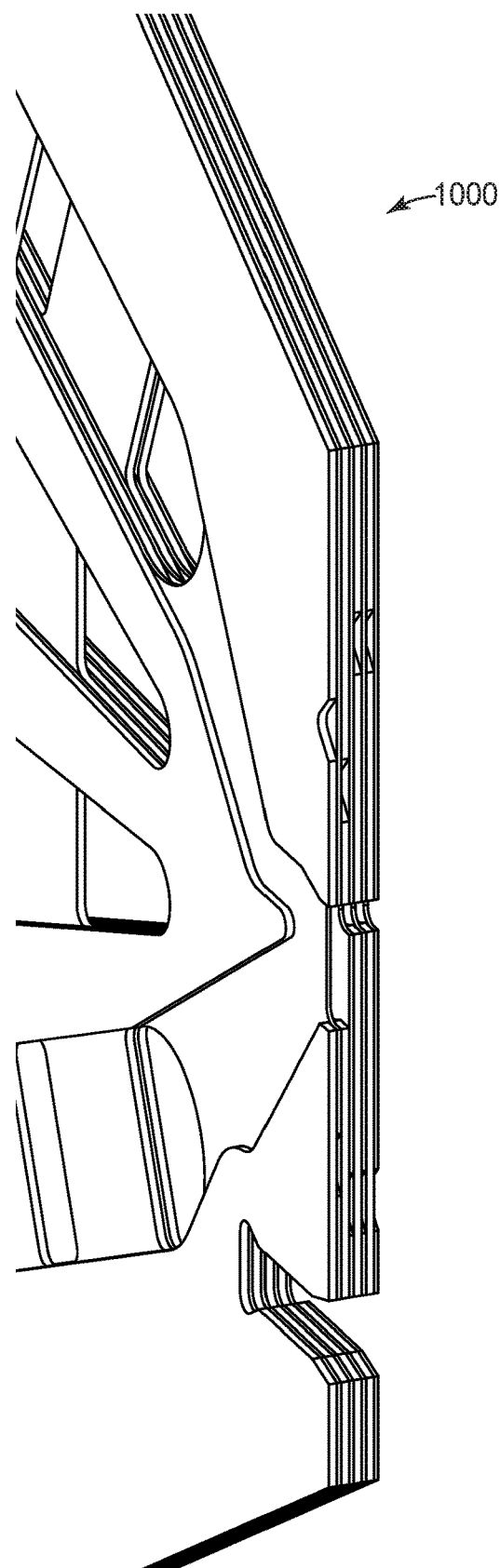
FIG. 10 is a perspective assembly drawing of several different exemplary sequences of shims employing the shims of FIGS. 5A-9A for making exemplary coextruded polymeric articles described herein, including the layer and first and second projections in a repeating arrangement as shown in FIGS. 1, 2 and 3.
Figure 11:
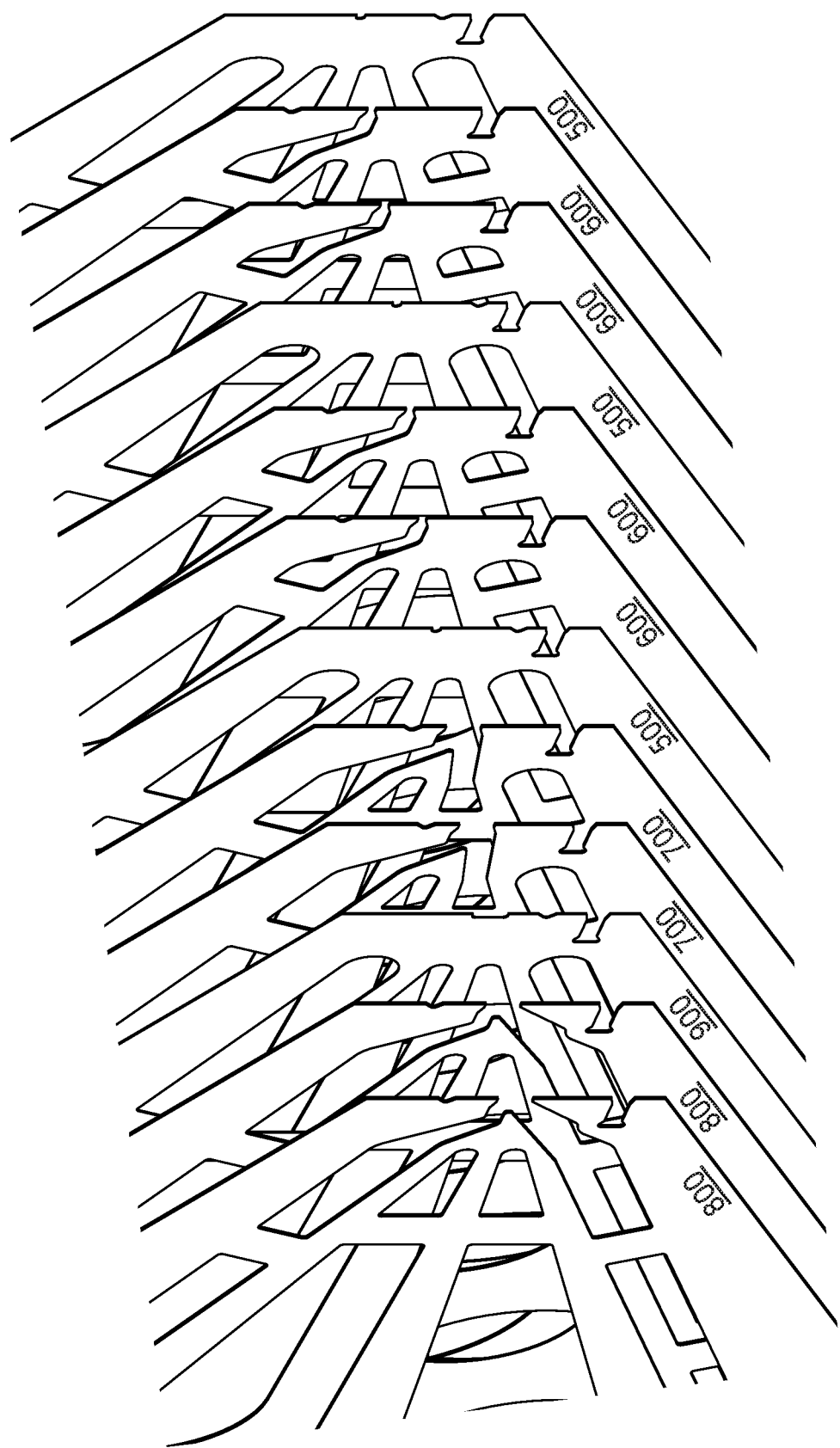
FIG. 11 is a perspective view of the some of the sequence of shims of FIG. 10, further exploded to reveal some individual shims.

Referring now to FIGS. 5A and 5B, a plan view of shim 500 is illustrated. Shim 500 has first aperture 560a, second aperture 560b third aperture 560c, and fourth aperture 560d. When shim 500 is assembled with others as shown in FIGS. 10 and 11, aperture 560a aids in defining first cavity 562a, aperture 560b aids in defining second cavity 562b, aperture 560c aids in defining third cavity 562c, and aperture 560d aids in defining third cavity 562d. Passageways 568a, 568b, 568c, and 568d cooperate with analogous passageways on adjacent shims to allow passage from cavities 562a, 562b, 562c, and 562d to the dispensing surfaces of the appropriate shims when the shims are assembled as shown in FIGS. 10 and 11.

Shim 500 has several holes 547 to allow the passage of, for example, bolts, to hold shim 500 and others to be described below into an assembly. Shim 500 also has dispensing surface 567, and in this embodiment, dispensing surface 567 has indexing groove 580 which can receive an appropriately shaped key to ease assembling diverse shims into a die. The shim may also have identification notch 582 to help verify that the die has been assembled in the desired manner. This embodiment has shoulders 590 and 592 which can assist in mounting the assembled die with a mount of the type shown in FIG. 13. Shim 500 has dispensing opening 556, but it will be noted that this shim has no connection between dispensing opening 556 and any of cavities 562a, 562b, 562c, or 562d. Shim 500 serves as a spacer shim and provides a sidewall for passageways of adjacent shims. Opening 556 provides a continuous dispensing slot for extrusion. This continuous slot enables polymer streams to merge together to form demarcation lines in the coextruded polymeric article between die orifices.

Figure 6A:
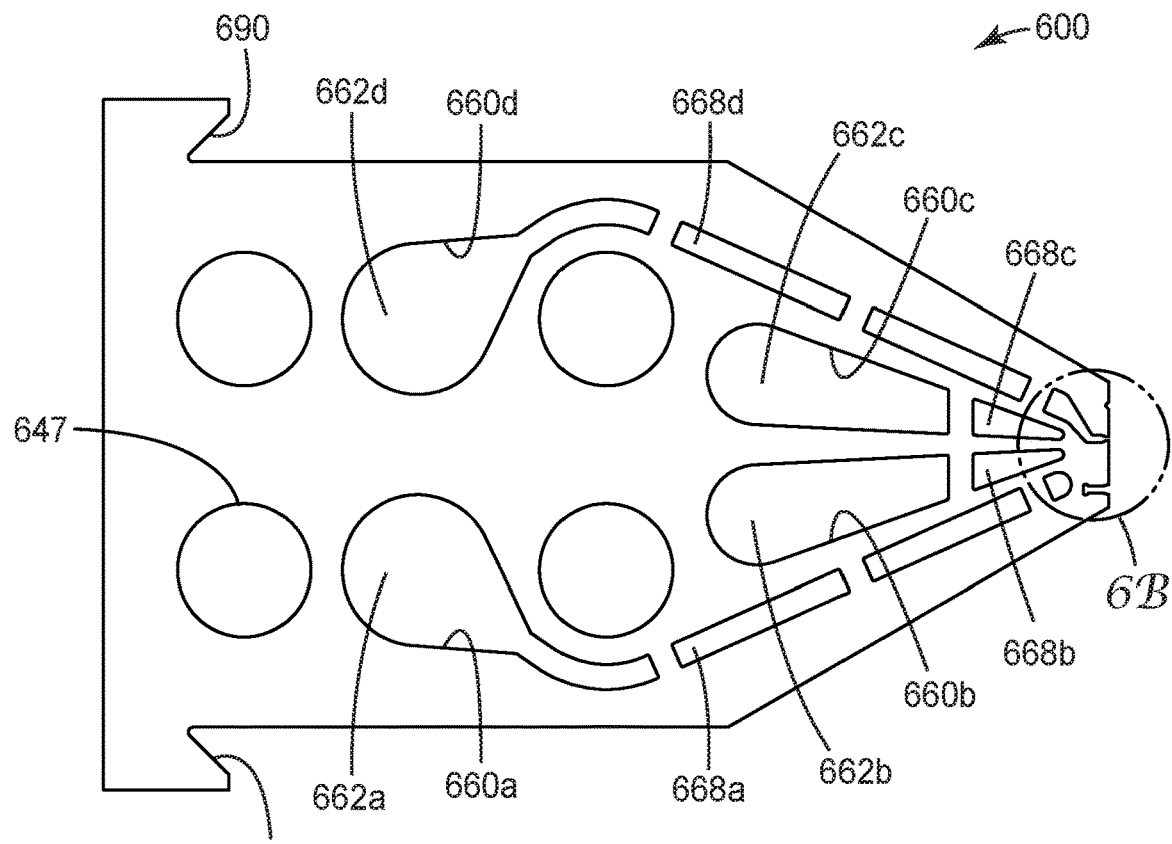
FIG. 6A is a plan view of an exemplary embodiment of a shim suited to form a sequence of shims capable of forming a coextruded polymeric article, for example, as shown in the schematic cross-sectional views of FIGS. 1, 2 and 3.
Figure 6B:
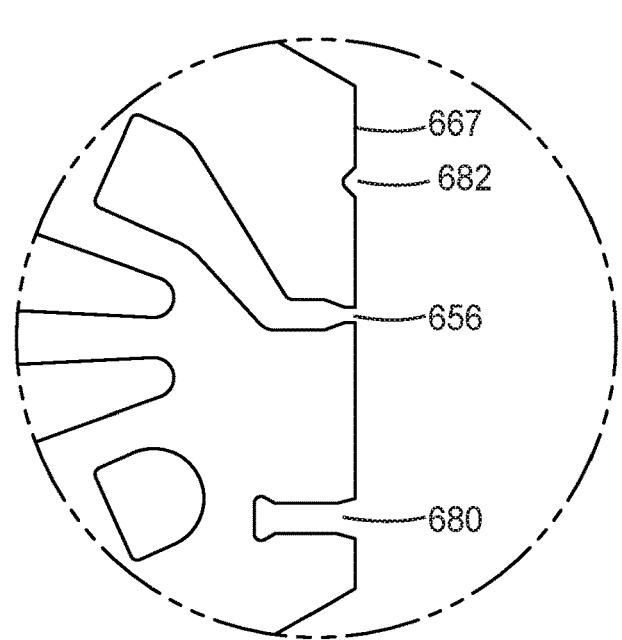
FIG. 6B is an expanded region near the dispensing surface of the shim shown in FIG. 6A.

Referring to FIGS. 6A and 6B, a plan view of shim 600 is illustrated. Shim 600 has first aperture 660a, second aperture 660b, third aperture 660c, and fourth aperture 660d. When shim 600 is assembled with others as shown in FIGS. 10 and 11, aperture 660a aids in defining first cavity 662a, aperture 660b aids in defining second cavity 662b, aperture 660c aids in defining third cavity 662c, and aperture 660d aids in defining third cavity 662d. Passageways 668a, 668b, 668c, and 668d cooperate with analogous passageways on adjacent shims to allow passage from cavities 662a, 662b, 662c, and 662d to the dispensing surfaces of the appropriate shims when the shims are assembled as shown in FIGS. 10 and 11.

Shim 600 has several holes 647 to allow the passage of, for example, bolts, to hold shim 600 and others to be described below into an assembly. Shim 600 also has dispensing surface 667, and in this embodiment, dispensing surface 667 has indexing groove 680 which can receive an appropriately shaped key to ease assembling diverse shims into a die. The shim may also have identification notch 682 to help verify that the die has been assembled in the desired manner. This embodiment has shoulders 690 and 692 which can assist in mounting the assembled die with a mount of the type shown in FIG. 13. Shim 600 has dispensing opening 656, in dispensing surface 667. Dispensing opening 656 may be more clearly seen in the expanded view shown in FIG. 6B. Dispensing opening 656 has connection to cavity 662d. It might seem that there is no path from cavity 662d to dispensing opening 656, via, for example, passageway 668d, but the flow has a route in the perpendicular-to-the-plane-of-the-drawing dimension when the sequence of FIG. 6 is completely assembled.

Figure 7A:
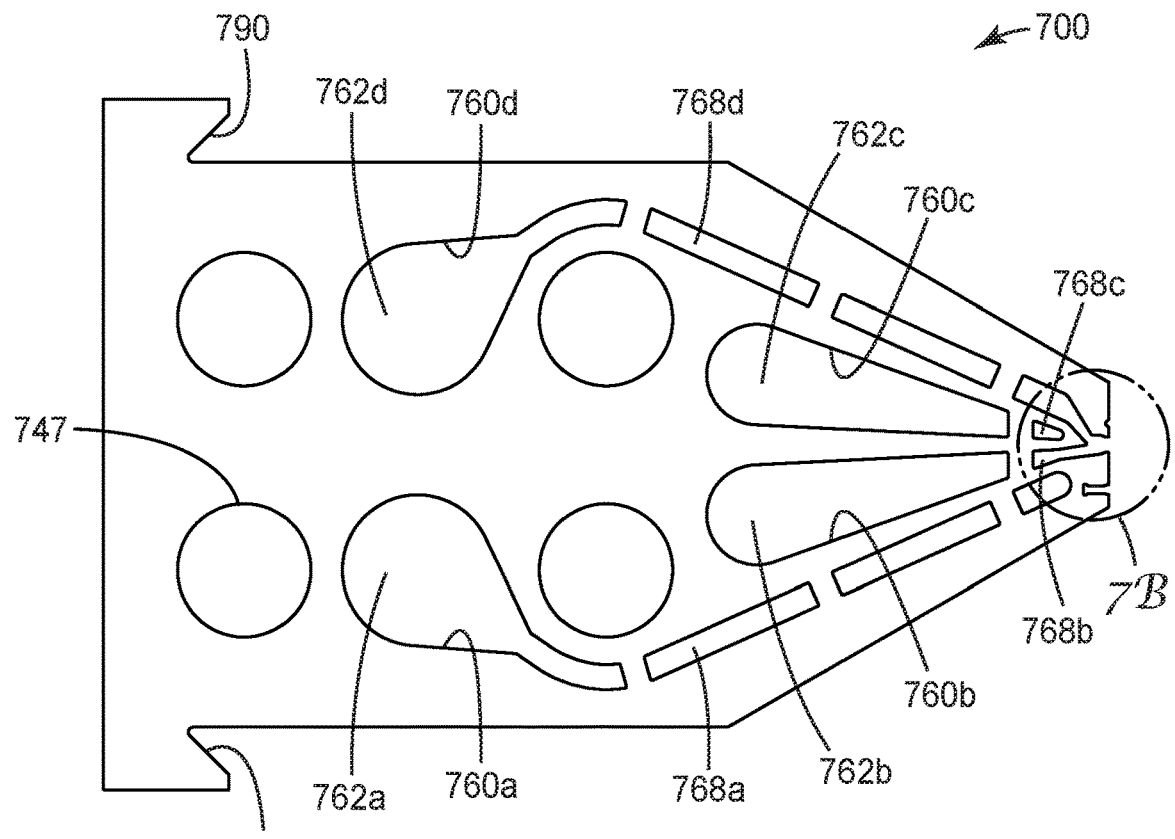
FIG. 7A is a plan view of an exemplary embodiment of a shim suited to form a sequence of shims capable of forming a coextruded polymeric article, for example, as shown in the schematic cross-sectional views of FIGS. 1, 2 and 3.
Figure 7B:
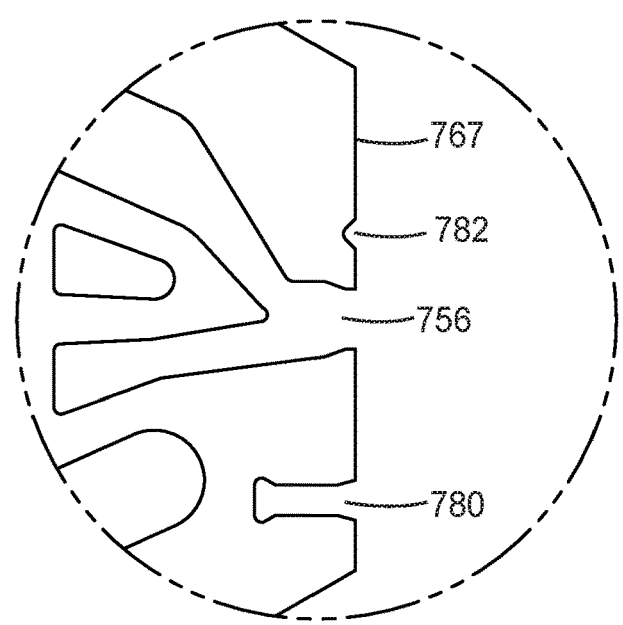
FIG. 7B is an expanded region near the dispensing surface of the shim shown in FIG. 7A.

Referring to FIGS. 7A and 7B, a plan view of shim 700 is illustrated. Shim 700 has first aperture 760a, second aperture 760b, third aperture 760c, and fourth aperture 760d. When shim 700 is assembled with others as shown in FIGS. 10 and 11, aperture 760a aids in defining first cavity 762a, aperture 760b aids in defining second cavity 762b, aperture 760c aids in defining third cavity 762c, and aperture 760d aids in defining third cavity 762d. Passageways 768a, 768b, 768c, and 768d cooperate with analogous passageways on adjacent shims to allow passage from cavities 762a, 762b, 762c, and 762d to the dispensing surfaces of the appropriate shims when the shims are assembled as shown in FIGS. 9 and 10.

Shim 700 has several holes 747 to allow the passage of, for example, bolts, to hold shim 700 and others to be described below into an assembly. Shim 700 also has dispensing surface 767, and in this embodiment, dispensing surface 767 has indexing groove 780 which can receive an appropriately shaped key to ease assembling diverse shims into a die. The shim may also have identification notch 782 to help verify that the die has been assembled in the desired manner. This embodiment has shoulders 790 and 792 which can assist in mounting the assembled die with a mount of the type shown in FIG. 13. Shim 700 has dispensing opening 756, with connection to cavities 762b, and 762d. Shim 700 creates a portion of the first layer with connection pathway 768d and also forms a projection with connection pathway 768b. These 2 streams merge together to form demarcation lines in the coextruded polymeric article between die orifices.

Figure 8A:
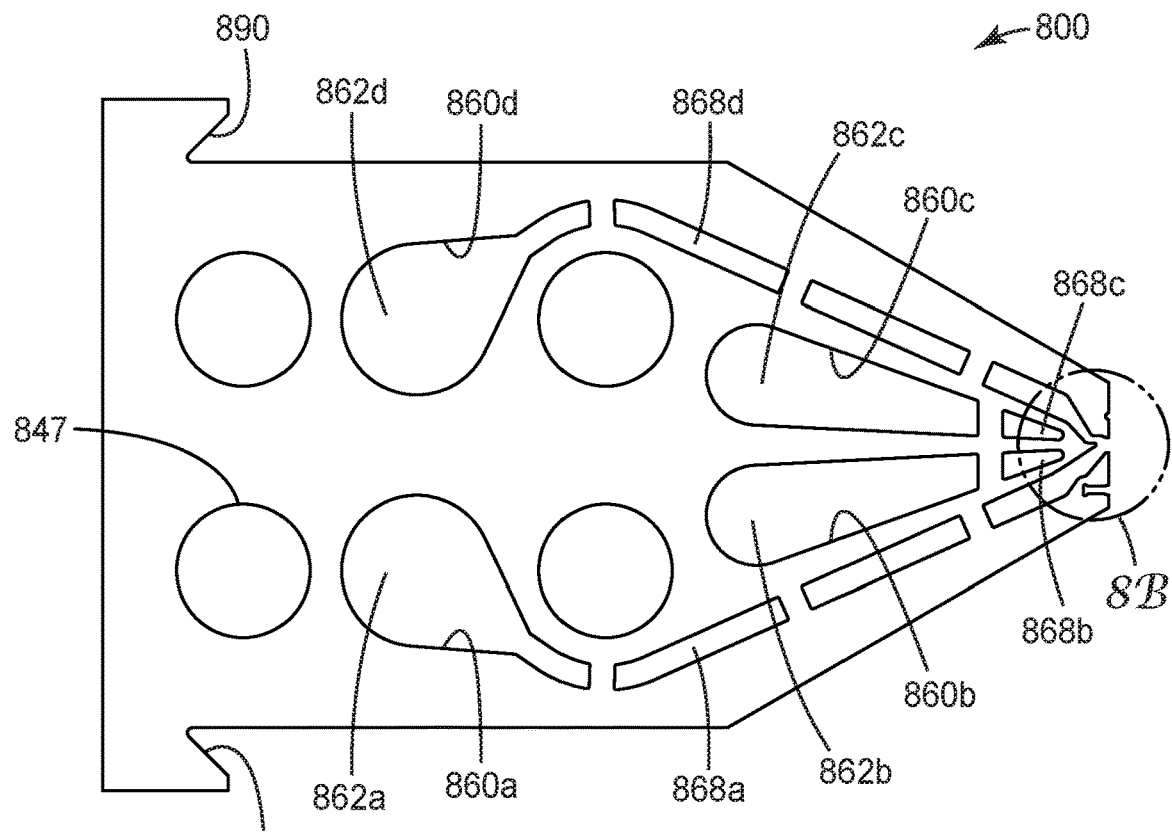
FIG. 8A is a plan view of an exemplary embodiment of a shim suited to form a sequence of shims capable of forming a coextruded polymeric article, for example, as shown in the schematic cross-sectional views of FIGS. 1, 2 and 3.
Figure 8B:
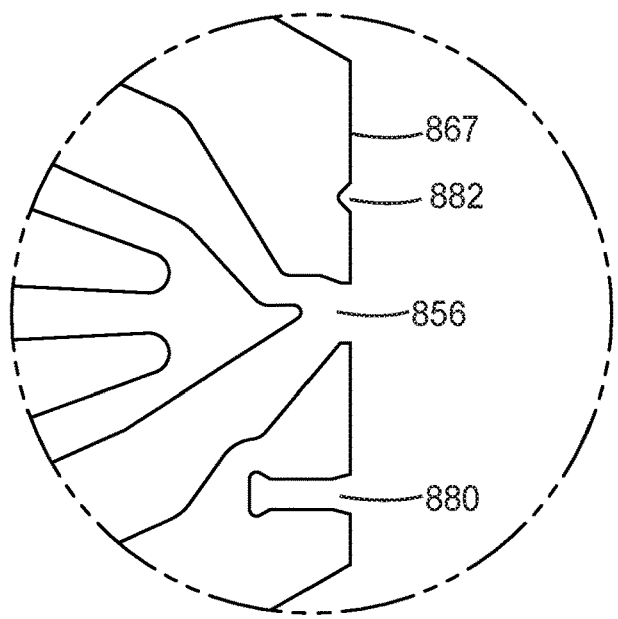
FIG. 8B is an expanded region near the dispensing surface of the shim shown in FIG. 8A.

Referring to FIGS. 8A and 8B, a plan view of shim 800 is illustrated. Shim 800 has first aperture 860a, second aperture 860b, third aperture 860c, and fourth aperture 860d. When shim 800 is assembled with others as shown in FIGS. 10 and 11, aperture 860a aids in defining first cavity 862a, aperture 860b aids in defining second cavity 862b, aperture 860c aids in defining third cavity 862c, and aperture 860d aids in defining third cavity 862d. Passageways 868a, 868b, 868c, and 868d cooperate with analogous passageways on adjacent shims to allow passage from cavities 862a, 862b, 862c, and 862d to the dispensing surfaces of the appropriate shims when the shims are assembled as shown in FIGS. 9 and 10.

Shim 800 has several holes 847 to allow the passage of, for example, bolts, to hold shim 800 and others to be described below into an assembly. Shim 800 also has dispensing surface 867, and in this embodiment, dispensing surface 867 has indexing groove 880 which can receive an appropriately shaped key to ease assembling diverse shims into a die. The shim may also have identification notch 882 to help verify that the die has been assembled in the desired manner. This embodiment has shoulders 890 and 892 which can assist in mounting the assembled die with a mount of the type shown in FIG. 13. Shim 800 has dispensing opening 856, in dispensing surface 867. There is a pathway connection between opening 856 and cavities 860a and 860d. Shim 800 creates a portion of the first layer with connection pathway 868d, and also forms a projection with connection pathway 868a. Dispensing opening 856 may be more clearly seen in the expanded view shown in FIG. 8B. It might seem that there is no path from cavity 862a and 862d to dispensing opening 856, via, for example, passageway 868a and 868d, but the flow has a route in the perpendicular-to-the-plane-of-the-drawing dimension when the sequence of FIG. 8 is completely assembled.

Figure 9A:
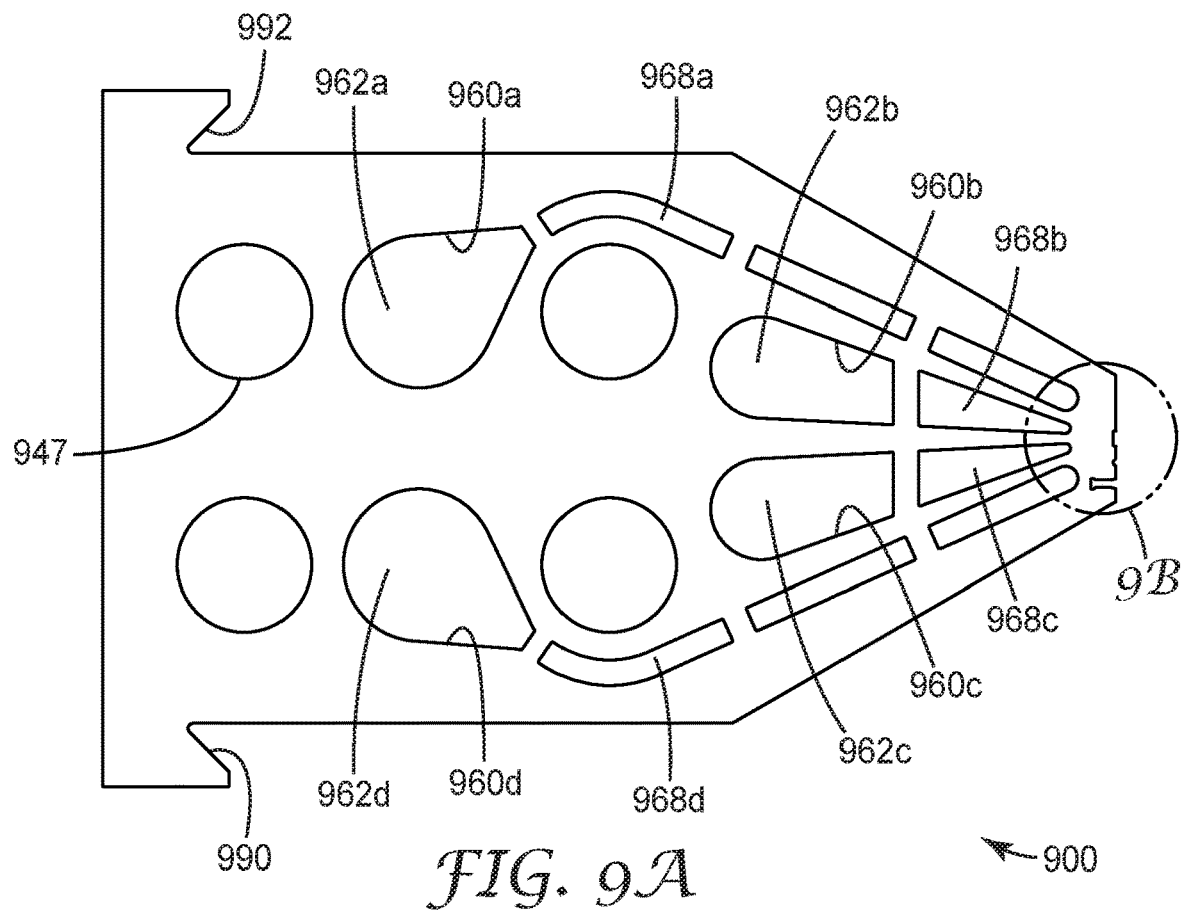
FIG. 9A is a plan view of an exemplary embodiment of a shim suited to form a sequence of shims capable of forming a coextruded polymeric article, for example, as shown in the schematic cross-sectional views of FIGS. 1, 2 and 3.
Figure 9B:
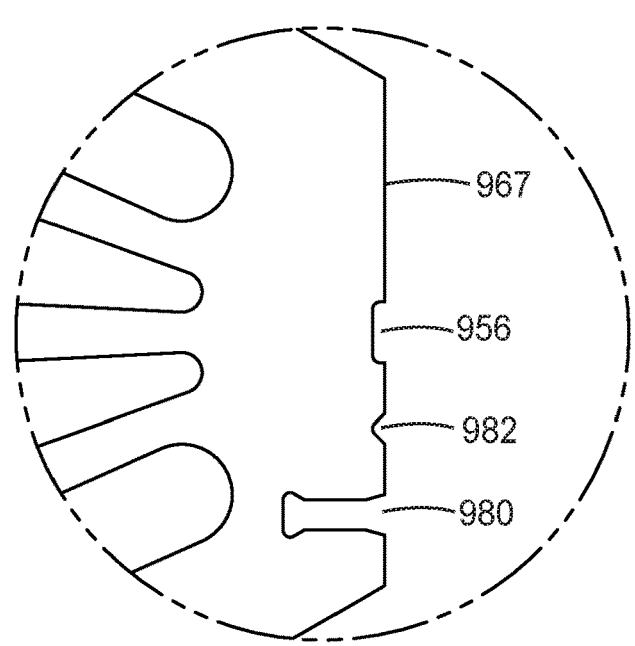
FIG. 9B is an expanded region near the dispensing surface of the shim shown in FIG. 9A.

Referring to FIGS. 9A and 9B, a plan view of shim 900 is illustrated. Shim 900 has first aperture 960a, second aperture 960b, third aperture 960c, and fourth aperture 960d. When shim 900 is assembled with others as shown in FIGS. 10 and 11, aperture 960a aids in defining first cavity 962a, aperture 960b aids in defining second cavity 962b, aperture 960c aids in defining third cavity 962c, and aperture 960d aids in defining third cavity 962d. Passageways 968a, 968b, 968c, and 968d cooperate with analogous passageways on adjacent shims to allow passage from cavities 962a, 962b, 962c, and 962d to the dispensing surfaces of the appropriate shims when the shims are assembled as shown in FIGS. 10 and 11.

Shim 900 has several holes 947 to allow the passage of, for example, bolts, to hold shim 900 and others to be described below into an assembly. Shim 900 also has dispensing surface 967, and in this embodiment, dispensing surface 967 has indexing groove 980 which can receive an appropriately shaped key to ease assembling diverse shims into a die. The shim may also have identification notch 982 to help verify that the die has been assembled in the desired manner. This embodiment has shoulders 990 and 992 which can assist in mounting the assembled die with a mount of the type shown in FIG. 13. Shim 900 has dispensing opening 956, in dispensing surface 967. Dispensing opening 956 may be more clearly seen in the expanded view shown in FIG. 9B. Shim 900 serves as a spacer shim, there is not a connection between opening 956 and any of the cavities.

Referring to FIG. 10, a perspective assembly drawing of a several different repeating sequences of shims, collectively 1000, employing the shims of FIGS. 5-9 to produce coextruded polymeric article 100 shown in FIG. 1, and coextruded polymeric article 200 shown in FIG. 2, and coextruded polymeric article 300 shown in FIG. 3 is shown. It should be noted in FIG. 10 that the dispensing slot, formed by dispensing openings 556, 656, 756, 856, and 956 collectively in the plurality of shims, is a continuous opening across the die. This continuous opening is fed from the three extrusion cavities and orifices as shown in FIG. 4. There are no shims without dispensing openings, which may form breaks to cause the extruded polymeric compositions to form into separated strands.

Referring to FIG. 11, an exploded perspective assembly drawing of a repeating sequence of shims employing the shims of FIGS. 5-9 is illustrated. In the illustrated embodiment, the repeating sequence includes, from bottom to top as the drawing is oriented, one instance of shim 500, two instances of shim 600 which forms the first orifice, one instance of shim 500, two instances of shim 600, one instance of shim 500, two instances of shim 700, one instance of shim 900, and two instances of shim 800. In this view, it can be appreciated how the three orifices are merged together at the extrusion slot to generate a continuous a coextruded polymeric article.

Figure 12:
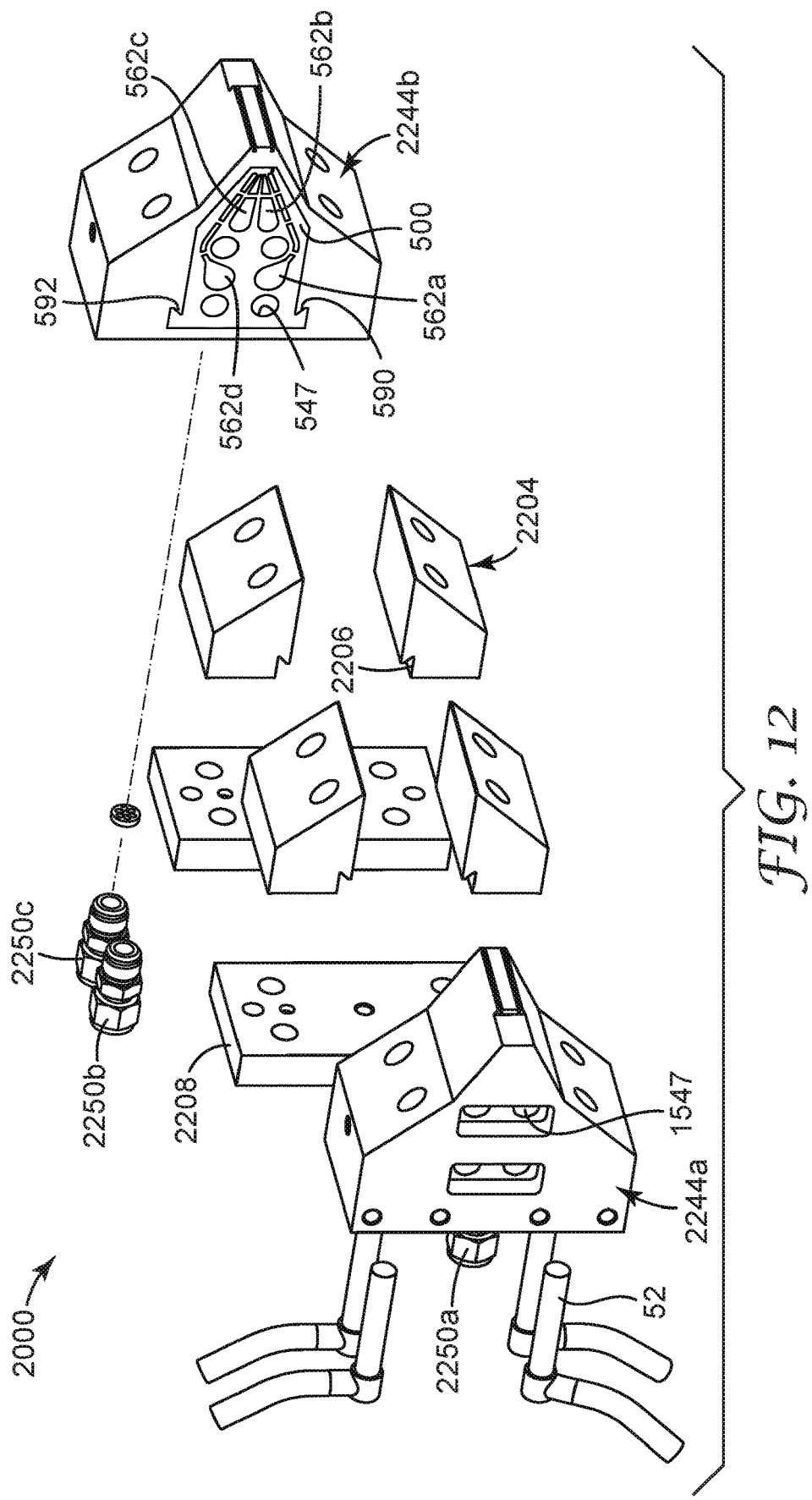
FIG. 12 is an exploded perspective view of an example of a mount suitable for an extrusion die composed of multiple repeats of the sequence of shims of FIGS. 10 and 11.

Referring to FIG. 12, an exploded perspective view of a mount 2000 suitable for an extrusion die composed of multiple repeats of the repeating sequence of shims of FIGS. 10 and 11 is illustrated. Mount 2000 is particularly adapted to use shims 500, 600, 700, 800, and 900 as shown in FIGS. 5-9. For visual clarity, however, only a single instance of shims is shown in FIG. 12. The multiple repeats of the repeating sequence of shims of FIGS. 10 and 11 are compressed between two end blocks 2244a and 2244b. Conveniently, through bolts can be used to assemble the shims to end blocks 2244a and 2244b, passing through holes 1547 in the end blocks and holes 547 in shims 500 et al.

In this embodiment, inlet fittings 2250a, b, and c provide a flow path for three streams of molten polymer through end blocks 2244a and 2244b to cavities 562a, 562b, and 562d. Cavity 562c is not used. Compression blocks 2204 have notch 2206 that conveniently engages the shoulders on shims (e.g., 590 and 592) on 500. When mount 2230 is completely assembled, compression blocks 2204 are attached by, for example, machine bolts to backplates 2208. Holes are conveniently provided in the assembly for the insertion of cartridge heaters 52.

Figure 13:
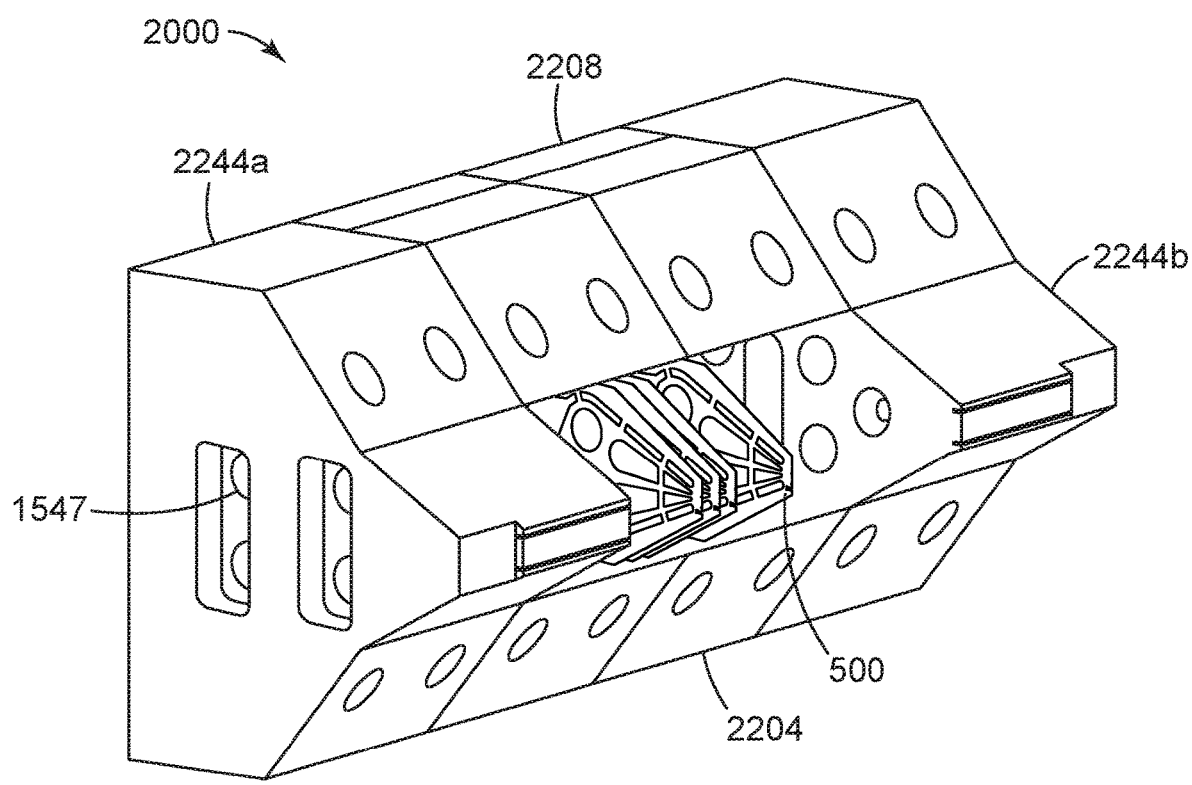
FIG. 13 is a perspective view of a mount of FIG. 12 in an assembled state.

Referring to FIG. 13, a perspective view of the mount 2000 of FIG. 13 is illustrated in a partially assembled state. A few shims, for example, 500 are in their assembled positions to show how they fit within mount 2000, but most of the shims that would make up an assembled die have been omitted for visual clarity.

In some embodiments, there are at least 2.5 (in some embodiments, at least 5, 10, 15, 20, 25, 30, 35, or even up to 40) projections pairs per cm.

In some embodiments, the projections of a coextruded polymeric article described herein are generally parallel to each other and generally perpendicular to the first major surface.

In some embodiments, the projections of a coextruded polymeric article described herein have an aspect ratio (i.e., height to thickness) of at least 2:1 (in some embodiments, at least 3:1, or even at least 4:1).

In some embodiments, the projection of a coextruded polymeric article described herein are spaced apart not more than 2 mm (in some embodiments, not more than 1 mm).

In some embodiments, the projections of a coextruded polymeric article described herein have a height and thickness and the thickness is along the length of each respective projections.

In some embodiments, each first projection has at least first and second opposed sides and a height from the first major surface to a distal end, wherein the height of the first projections is not greater than 2 mm (in some embodiments, not greater than 1.5 mm, or even not greater than 1 mm), and wherein there are at least 2.5 (in some embodiments, at least 5, 10, 15, or even at least 20) projection pairs per centimeter.

In some embodiments, for a majority by number (i.e., at least 50 percent by number; in some embodiments, at least 55, 60, 65, 70, 75, 80, 85, 90, 95, or even 100 percent) of the projection pairs, the height of the second projection is greater than the height of the attached first projection.

In some embodiments, the height of the protrusions of a coextruded polymeric article described herein are in a range from 0.1 mm to 5 mm (in some embodiments, in a range from 0.1 mm to 2 mm, or even 0.1 mm to 1 mm).

In some embodiments, the protrusions of a coextruded polymeric article described herein have a longest cross-sectional dimension in the direction normal to the projections in a range from 0.05 mm to 0.5 mm (in some embodiments, in a range from 0.05 mm to 0.2 mm, or even 0.05 mm to 0.1 mm).

In some embodiments, regions of a coextruded polymeric article described herein have a distance between protrusions in a range from 0.25 mm to 5 mm (in some embodiments, in a range from 0.25 mm to 2 mm, or even 0.25 mm to 1 mm).

In some embodiments of a coextruded polymeric article described herein, there is a distance between the first and second major surfaces are in a range from 0.05 mm to 5 mm (in some embodiments, in a range from 0.05 mm to 3 mm, 0.05 mm to 2 mm, or even 0.1 mm to 1 mm).

One exemplary use for articles described herein is as a coextruded polymeric adhesive article, wherein an adhesive is initially not exposed to contact to a substrate brought into proximity of the article, and can subsequently be exposed to contact to the substrate after mechanical movement of the projections of the article, such as through hand-pressure in a shearing mode.

In some embodiments, polymeric materials used to make coextruded polymeric articles described herein may comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the art (e.g., to achieve desired color, tone, opacity, transmissivity, etc.). If desired, the polymeric materials may be formulated to have the same or different colors.

Another exemplary use for coextruded polymeric articles described herein is as a household cleaning product (e.g., a mop, a duster, a brush, a cleaning cloth, or a lint roller) whose effectiveness is increased by the movement inherent to its use.

Another exemplary use for coextruded polymeric articles described herein is as an adhesive article that can be adhesively attached to a substrate by slight shearing motion (e.g., a wall attachment that can be positioned without any adhesion), and subsequently adhered to the wall by gentle hand pressure accompanied by a slight shearing movement. The wall attachment can be subsequently removable by peeling. Another exemplary coextruded polymeric adhesive article has two levels of adhesiveness, which can be applied to a substrate at a low level of adhesiveness, repositioned as needed, and then subsequently be made to be highly adhesive by applying gentle hand pressure accompanied by a slight shearing movement. Yet another exemplary coextruded polymeric adhesive article has three levels of adhesiveness and two-sided adhesiveness. Such coextruded polymeric articles can behave as any described above, and then, on the still exposed surface (the surface opposing the surface already adhered to a substrate) can exhibit adhesiveness with respect to an additional substrate or article. For example, the coextruded polymeric article can be positioned against a wall, repositioned freely in a state of no or little adhesiveness. A gentle hand pressure can be applied accompanied with a slight shearing movement to provide a high level of adhesiveness. Then use of a third level of adhesiveness existing on the side of the coextruded polymeric adhesive article opposite the side adhered to the wall (which may be the same or different from either of the first two levels of adhesiveness) can be made to affix other objects to the wall such as posters, handbills, and other decorative materials, either permanently or removably, either once or repeatedly.

It is also within the scope of the present disclosure that properties in addition to adhesiveness can be triggered to exhibit tiered behavior in embodiments of coextruded polymeric articles described herein. For example, various chemical properties can also be utilized to provide channeling webs or tapes. An exemplary coextruded polymeric article could have hydrophobic projections and hydrophilic protrusions. Water, for instance, gently encountering such a coextruded polymeric article from the side having the projections would bead-up on the coextruded polymeric article, unless it approached with a determinate level of force or pressure, whereupon it would penetrate between projections deeply enough to encounter hydrophilic protrusions, and would be wicked down-channel due to hydrostatic forces, while still unable to penetrate through the layer to any appreciable extent.

Exemplary Embodiments

1A. A coextruded polymeric article comprising a layer comprising first and second opposed major surfaces, wherein a plurality of attached projection pairs comprising first and second projections extend from only the first major surface (i.e., the second major surface is free of any projections), wherein each first projection has at least first and second opposed sides and a height from the first major surface to a distal end, wherein the height of the first projections is not greater than 2 mm (in some embodiments, not greater than 1.5 mm, or even not greater than 1 mm), and wherein there are at least 2.5 (in some embodiments, at least 5, 10, 15, or even at least 20) projection pairs per centimeter.

2A. The coextruded polymeric article of Exemplary Embodiment 1A having a (machine direction) length of at least 5 mm (in some embodiments, at least 10 mm, 25 mm, 50 mm, 1 cm, 5 cm, 10 cm, 50 cm, 75 cm, 1 m, 5 m, 10 m, 25 m, 50 m, 100 m, 500 m, or even at least 1000 m).

3A. The coextruded polymeric article of Exemplary Embodiment 2A, wherein the protrusions and projections extend along the length of the coextruded polymeric article (i.e., have respective lengths of at least 5 mm (in some embodiments, at least 10 mm, 25 mm, 50 mm, 1 cm, 5 cm, 10 cm, 50 cm, 75 cm, 1 m, 5 m, 10 m, 25 m, 50 m, 100 m, 500 m, or even at least 1000 m)).

4A. The coextruded polymeric article of any preceding A Exemplary Embodiment, wherein for a majority by number (i.e., at least 50 percent by number; in some embodiments, at least 55, 60, 65, 70, 75, 80, 85, 90, 95, or even 100 percent) of the projection pairs, the height of the second projection is greater than the height of the attached first projection.

5A. The coextruded polymeric article of any preceding A Exemplary Embodiment, wherein the first projections comprise first material, wherein the second projections comprise second material, wherein the layer comprises third material, and wherein at least two of the first, second, and third materials are different.

6A. The coextruded polymeric article of any preceding A Exemplary Embodiment, wherein at least one of the first or second projections comprise adhesive.

7A. The coextruded polymeric article of Exemplary Embodiment 6A, wherein the adhesive is at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

8A. The coextruded polymeric article of any of Exemplary Embodiments 1A to 4A, wherein the first projections comprise first adhesive, wherein the second projections comprise second adhesive, wherein the layer comprises third adhesive, and wherein at least two of the first, second, and third adhesives are different.

9A. The coextruded polymeric article of Exemplary Embodiment 8A, wherein the first, second, and third adhesive are independently at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

10A. The coextruded polymeric article of any of Exemplary Embodiments 1A to 4A, wherein the first projections comprise first adhesive, wherein the second projections comprise second adhesive, wherein the layer comprises third adhesive, and wherein each of the first, second, and third adhesives are different.

11A. The coextruded polymeric article of Exemplary Embodiment 10A, wherein the first, second, and third adhesive are independently at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

12A. The coextruded polymeric article of any of Exemplary Embodiments 1A to 4A, wherein the first projections comprise first adhesive, wherein the second projections comprise second, different adhesive.

13A. The coextruded polymeric article of Exemplary Embodiment 12A, wherein the first, second, and third adhesive are independently at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

14A. The coextruded polymeric article of any preceding A Exemplary Embodiment, wherein there is a demarcation line between connected projections.

15A. The coextruded polymeric article of any preceding A Exemplary Embodiment, wherein there is a demarcation line between the first projections and the first major surface of the layer.

16A. The coextruded polymeric article of any preceding A Exemplary Embodiment, wherein there is a demarcation line between the second projections and the first major surface of the layer.

17A. The coextruded polymeric article of any preceding A Exemplary Embodiment, wherein the projections are generally parallel to each other and generally perpendicular to the first major surface of the layer.

18A. The coextruded polymeric article of any preceding A Exemplary Embodiment, wherein the first and second projections independently have heights from the first major surface of the layer and widths and an aspect ratio (i.e., height to width) of at least 2:1 (in some embodiments, at least 3:1, or even at least 4:1).

19A. The coextruded polymeric article of any preceding A Exemplary Embodiment, wherein the height of the first and second projections are independently in a range from 0.1 mm to 5 mm (in some embodiments, in a range from 0.1 mm to 2 mm, or even 0.1 mm to 1 mm).

20A. The coextruded polymeric article of any preceding A Exemplary Embodiment, wherein the first and second projections independently have a longest cross-sectional dimension in a range from 0.05 mm to 0.5 mm (in some embodiments, in a range from 0.05 mm to 0.2 mm, or even 0.05 mm to 0.1 mm).

21A. The coextruded polymeric article of any preceding A Exemplary Embodiment having a distance between the first and second major surfaces of the layer are in a range from 0.05 mm to 5 mm (in some embodiments, in a range from 0.05 mm to 3 mm, 0.05 mm to 2 mm, or even 0.1 mm to 1 mm).

22A. The coextruded polymeric article of any preceding A Exemplary Embodiment, wherein the first and second protrusions have a height ratio of at least 1.5:1 (in some embodiments, at least 1.2:1, 1.1:1, 1.05:1, or even at least 1.01:1).

1B. A method of making a coextruded polymeric article of any preceding A Exemplary Embodiment, the method comprising:

providing an extrusion die comprising a plurality of shims positioned adjacent to one another, the shims together defining a first cavity, a second cavity, a third cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice;

providing via extrusion a first material to the first cavity of the extrusion die, a second material to the second cavity of the extrusion die, and a third material to the third cavity of the extrusion die;

extruding a layer from the distal opening of the die slot; and quenching the extruded layer.

1C. A coextruded polymeric article comprising a layer comprising first and second opposed major surfaces, wherein a plurality of attached projection pairs comprising first and second projections extend from only the first major surface (i.e., the second major surface is free of any projections), wherein each first projection has at least first and second opposed sides and a height from the first major surface to a distal end, wherein the a majority by number (i.e., at least 50 percent by number; in some embodiments, at least 55, 60, 65, 70, 75, 80, 85, 90, 95, or even 100 percent) of the projection pairs, the height of the second projection is greater than the height of the attached first projection, and wherein at least one of the first or second projections comprise adhesive.

2C. The coextruded polymeric article of Exemplary Embodiment 1C, wherein the height of the first projections is not greater than 2 mm (in some embodiments, not greater than 1.5 mm, or even not greater than 1 mm), and wherein there are at least 2.5 (in some embodiments, at least 5, 10, 15, or even at least 20) projection pairs per centimeter.

3C. The coextruded polymeric article of any preceding C Exemplary Embodiment having a (machine direction) length of at least 5 mm (in some embodiments, at least 10 mm, 25 mm, 50 mm, 1 cm, 5 cm, 10 cm, 50 cm, 75 cm, 1 m, 5 m, 10 m, 25 m, 50 m, 100 m, 500 m, or even at least 1000 m).

4C. The coextruded polymeric article of Exemplary Embodiment 3C, wherein the protrusions and projections extend along the length of the coextruded article (i.e., have respective lengths of at least 5 mm (in some embodiments, at least 10 mm, 25 mm, 50 mm, 1 cm, 5 cm, 10 cm, 50 cm, 75 cm, 1 m, 5 m, 10 m, 25 m, 50 m, 100 m, 500 m, or even at least 1000 m).

5C. The coextruded polymeric article of any preceding C Exemplary Embodiment, wherein the adhesive is at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

6C. The coextruded polymeric article of any of Exemplary Embodiments 1C to 4C, wherein the first projections comprise first adhesive, wherein the second projections comprise second, adhesive, wherein the layer comprises third adhesive, and wherein at least two of the first, second, and third adhesives are different.

7C. The coextruded polymeric article of Exemplary Embodiment 6C, wherein the first, second, and third adhesive are independently at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

8C. The coextruded polymeric article of any of Exemplary Embodiments 1C to 4C, wherein the first projections comprise first adhesive, wherein the second projections comprise second, adhesive, wherein the layer comprises third adhesive, and wherein each of the first, second, and third adhesives are different.

9C. The coextruded polymeric article of Exemplary Embodiment 8C, wherein the first, second, and third adhesive are independently at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

10C. The coextruded polymeric article of any Exemplary Embodiments 1C to 4C, wherein the first projections comprise first adhesive, wherein the second projections comprise second, different adhesive.

11C. The coextruded polymeric article of Exemplary Embodiment 10C, wherein the first, second, and third adhesive are independently at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

12C. The coextruded polymeric article of any preceding C Exemplary Embodiment, wherein there is a demarcation line between connected projections.

13C. The coextruded polymeric article of any preceding C Exemplary Embodiment, wherein there is a demarcation line between the first projections and the first major surface of the layer.

14C. The coextruded polymeric article of any preceding C Exemplary Embodiment, wherein there is a demarcation line between the second projections and the first major surface of the layer.

15C. The coextruded polymeric article of any preceding C Exemplary Embodiment, wherein the projections are generally parallel to each other and generally perpendicular to the first major surface of the layer.

16C. The coextruded polymeric article of any preceding C Exemplary Embodiment, wherein the first and second projections independently have heights from the first major surface of the layer and widths and an aspect ratio (i.e., height to width) of at least 2:1 (in some embodiments, at least 3:1, or even at least 4:1).

17C. The coextruded polymeric article of any preceding C Exemplary Embodiment, wherein the projection pairs are spaced apart not more than 2 mm (in some embodiments, not more than 1 mm).

18C. The coextruded polymeric article of any preceding C Exemplary Embodiment, wherein there is a distance between protrusion pairs in a range from 0.25 mm to 5 mm (in some embodiments, in a range from 0.25 mm to 2 mm, or even 0.25 mm to 1 mm).

19C. The coextruded polymeric article of any preceding C Exemplary Embodiment, wherein the height of the first and second projections are independently in a range from 0.1 mm to 5 mm (in some embodiments, in a range from 0.1 mm to 2 mm, or even 0.1 mm to 1 mm).

20C. The coextruded polymeric article of any preceding C Exemplary Embodiment, wherein the first and second projections independently have a longest cross-sectional dimension in a range from 0.05 mm to 0.5 mm (in some embodiments, in a range from 0.05 mm to 0.2 mm, or even 0.05 mm to 0.1 mm).

21C. The coextruded polymeric article of any preceding C Exemplary Embodiment having a distance between the first and second major surfaces of the layer are in a range from 0.05 mm to 5 mm (in some embodiments, in a range from 0.05 mm to 3 mm, 0.05 mm to 2 mm, or even 0.1 mm to 1 mm).

22C. The coextruded polymeric article of any preceding C Exemplary Embodiment, wherein the first and second protrusions have a height ratio of at least 1.5:1 (in some embodiments, at least 1.2:1, or even 1.1:1, 1.05:1, or even at least 1.01:1).

1D. A method of making a coextruded polymeric article of any preceding C Exemplary Embodiment, the method comprising:

providing an extrusion die comprising a plurality of shims positioned adjacent to one another, the shims together defining a first cavity, a second cavity, a third cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice;

providing via extrusion a first material to the first cavity of the extrusion die, a second material to the second cavity of the extrusion die, and a third material to the third cavity of the extrusion die;

extruding a layer from the distal opening of the die slot; and quenching the extruded layer.

1E. A coextruded polymeric article comprising a layer comprising first and second opposed major surfaces, wherein a plurality of attached projection pairs comprising first and second projections extend from only the first major surface (i.e., the second major surface is free of any projections), wherein each first projection has at least first and second opposed sides and a height from the first major surface to a distal end, and wherein there is a demarcation line between the attached projections.

2E. The coextruded polymeric article of Exemplary Embodiment 1E, wherein the height of the first projections is not greater than 2 mm (in some embodiments, not greater than 1.5 mm, or even not greater than 1 mm), and wherein there are at least 2.5 (in some embodiments, at least 5, 10, 15, or even at least 20) projection pairs per centimeter.

3E. The coextruded polymeric article of any preceding E Exemplary Embodiment having a machine direction length wherein the projections extend at least 5 mm along the entire machine direction length of the coextruded polymeric article layer.

4E. The coextruded polymeric article of any preceding E Exemplary Embodiment, wherein for a majority by number (i.e., at least 50 percent by number; in some embodiments, at least 55, 60, 65, 70, 75, 80, 85, 90, 95, or even 100 percent) of the projection pairs, the height of the second projection is greater than the height of the attached first projection.

5E. The coextruded polymeric article of any preceding E Exemplary Embodiment, wherein at least one of the first or second projections comprise adhesive.

6E. The coextruded polymeric article of Exemplary Embodiment 5E, wherein the adhesive is at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

7E. The coextruded polymeric article of any of Exemplary Embodiments 1E to 4E, wherein the first projections comprise first adhesive, wherein the second projections comprise second, adhesive, wherein the layer comprises third adhesive, and wherein at least two of the first, second, and third adhesives are different.

8E. The coextruded polymeric article of Exemplary Embodiment 7E, wherein the first, second, and third adhesive are independently at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

9E. The coextruded polymeric article of any of Exemplary Embodiments 1E to 4E, wherein the first projections comprise first adhesive, wherein the second projections comprise second, adhesive, wherein the layer comprises third adhesive, and wherein each of the first, second, and third adhesives are different.

10E. The coextruded polymeric article of Exemplary Embodiment 9E, wherein the first, second, and third adhesive are independently at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

11E. The coextruded polymeric article of any of Exemplary Embodiments 1E to 4E, wherein the first projections comprise first adhesive, wherein the second projections comprise second, different adhesive.

12E. The coextruded polymeric article of Exemplary Embodiment 11E, wherein the first, second, and third adhesive are independently at least one of an acrylate copolymer pressure sensitive adhesive, a rubber-based adhesive (e.g., those based on at least one of natural rubber, polyisobutylene, polybutadiene, butyl rubber, or styrene block copolymer rubber), a silicone polyurea-based adhesive, a silicone polyoxamide-based adhesive, a polyurethane-based adhesive, or a poly(vinyl ethyl ether)-based adhesive.

13E. The coextruded polymeric article of any preceding E Exemplary Embodiment, wherein there is a demarcation line between connected projections.

14E. The coextruded polymeric article of any preceding E Exemplary Embodiment, wherein there is a demarcation line between the first projections and the first major surface of the layer.

15E. The coextruded polymeric article of any preceding E Exemplary Embodiment, wherein there is a demarcation line between the second projections and the first major surface of the layer.

16E. The coextruded polymeric article of any preceding E Exemplary Embodiment, wherein the projections are generally parallel to each other and generally perpendicular to the first major surface of the layer.

17E. The coextruded polymeric article of any preceding E Exemplary Embodiment, wherein the first and second projections independently have heights from the first major surface of the layer and widths and an aspect ratio (i.e., height to width) of at least 2:1 (in some embodiments, at least 3:1, or even at least 4:1).

18E. The coextruded polymeric article of any preceding E Exemplary Embodiment, wherein the projection pairs are spaced apart not more than 2 mm (in some embodiments, not more than 1 mm).

19E. The coextruded polymeric article of any preceding E Exemplary Embodiment, wherein there is a distance between protrusion pairs in a range from 0.25 mm to 5 mm (in some embodiments, in a range from 0.25 mm to 2 mm, or even 0.25 mm to 1 mm).

20E. The coextruded polymeric article of any preceding E Exemplary Embodiment, wherein the height of the first and second projections are independently in a range from 0.1 mm to 5 mm (in some embodiments, in a range from 0.1 mm to 2 mm, or even 0.1 mm to 1 mm).

21E. The coextruded polymeric article of any preceding E Exemplary Embodiment, wherein the first and second projections independently have a longest cross-sectional dimension in a range from 0.05 mm to 0.5 mm (in some embodiments, in a range from 0.05 mm to 0.2 mm, or even 0.05 mm to 0.1 mm).

22E. The coextruded polymeric article of any preceding E Exemplary Embodiment having a distance between the first and second major surfaces of the layer are in a range from 0.05 mm to 5 mm (in some embodiments, in a range from 0.05 mm to 3 mm, 0.05 mm to 2 mm, or even 0.1 mm to 1 mm).

23E. The coextruded polymeric article of any preceding E Exemplary Embodiment, wherein the first and second protrusions have a height ratio of at least 1.5:1 (in some embodiments, at least 1.2:1, or even 1.1:1, 1.05:1, or even at least 1.01:1).

1F. A method of making a coextruded polymeric article of any preceding E Exemplary Embodiment, the method comprising:

providing an extrusion die comprising a plurality of shims positioned adjacent to one another, the shims together defining a first cavity, a second cavity, a third cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the third cavity and a third orifice, a second plurality of a repeating sequence of shims that together provide a fluid passageway between the first cavity and a first orifice and also together provide a fluid passageway between the third cavity and a third orifice, and a third plurality of shims that together provide a fluid passageway between the second cavity and a second orifice and also together provide a fluid passageway between the third cavity and a third orifice;

providing via extrusion a first material to the first cavity of the extrusion die, a second material to the second cavity of the extrusion die, and a third material to the third cavity of the extrusion die;

extruding a layer from the distal opening of the die slot; and quenching the extruded layer.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Prophetic Example 1

A co-extrusion die as generally depicted in FIGS. 12 and 13 can be assembled with a multi shim repeating pattern of extrusion orifices as generally illustrated in FIG. 10. The thickness of the shims in the repeat sequence can be 4 mils (0.102 mm) for shims 600, 700, and 800 and 2 mils (0.51 mm) for shim 500, and 900. These shims can be formed from stainless steel, with perforations cut by a wire electron discharge machining. The shims can be stacked in a repeating sequence 500, 600, 600, 500, 600, 600, 500, 700, 700, 900, 800 and 800. The extrusion orifices can be aligned in a collinear, alternating arrangement. The total width of the shim setup can be about 12.5 cm. (5 inches).

The inlet fittings on the two end blocks can be each connected to three conventional single-screw extruders. The extruders feeding the three cavities can be loaded with a thermoplastic polymer such as polyethylene copolymer (available, for example, under the trade designation "ELV-ALOY 1609" from DuPont Company, Wilmington, DE). The thermoplastic polymer for the first cavity can be dry blended with a color concentrate such as yellow color concentrate (available, for example, under the trade designation "10038103" from PolyOne Distribution, Romeoville, IL). The thermoplastic polymer for the second cavity can be dry blended with a second color concentrate such as green color concentrate (available, for example, under the trade designation "PP64643536" from Clariant, Minneapolis, MN). The extruder feeding the third cavity can be dry blended with a third color concentrate such as white color concentrate (available, for example obtained under the trade designation "PP1015100S" from Clariant).

The melt can be extruded vertically into an extrusion quench takeaway. The quench roll can be a smooth temperature controlled chrome plated 20 cm diameter steel roll or similar devise. The quench temperature can be controlled with internal water flow. The web path can be wrapped 180 degrees around a chrome steel roll and then to a windup roll.

Other process conditions that can be used are listed below:

| | |
|---|---|
| Flow rate of first polymer (base layer) | at least 1 kg/hr. |
| Flow rate of second polymer (first projection) | at least 1 kg/hr. |
| Flow rate of third polymer (second projection) | at least 1 kg/hr. |
| Extrusion temperature | 190° C. or higher or lower dependent upon pressures |
| Quench roll temperature | 10° C. or higher or lower |
| Quench takeaway speed | at least 1 m/min. |

Prophetic Example 2

Prophetic Example 2 can be made the as described for Prophetic Example 1, except that an adhesive can be used as the third polymer for the second projection. The extruder feeding the third cavity can be loaded with acrylate copolymer adhesive (available, for example, under the trade designation "R 55586" from 3M Company, St. Paul, MN), or other acrylates for suitable adhesive performance.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A coextruded polymeric article comprising a layer comprising first and second opposed major surfaces, wherein a plurality of attached projection pairs comprising first and second projections extend from only the first major surface, least first and second opposed sides and a height from the first major surface to a distal end, wherein each first projection has at least first and second opposed sides and a height from the first major surface to a distal end, wherein the height of the first projections is not greater than 2 mm, and wherein there are at least 2.5 projection pairs per centimeter projection pairs per centimeter.

2. The coextruded polymeric article of claim 1 having a length of at least 5 millimeters.

3. The coextruded polymeric article of claim 2, wherein the protrusions and projections extend along the length of the coextruded polymeric article.

4. The coextruded polymeric article of claim 1, wherein the projections are generally parallel to each other and generally perpendicular to the first major surface.

5. The coextruded polymeric article of claim 1, wherein the projections have an aspect ratio of at least 2 to 1.

6. A coextruded polymeric article comprising a layer comprising first and second opposed major surfaces, wherein a plurality of attached projection pairs comprising first and second projections extend from only the first major surface of the layer, wherein each first projection has at least first and second opposed sides and a height from the first major surface of the layer to a distal end, wherein each second projection has at least first and second opposed sides and a height from the first major surface to a distal end, wherein for each projection pair the second side of the first projection is in continuous contact with the first side of the second projection is greater than the height of the attached first projection, and wherein at least one of the first or second projections comprise adhesive.

7. The coextruded polymeric article of claim 6 having a length of at least 5 millimeters.

8. The coextruded polymeric article of claim 7, wherein the projections extend along the length of the coextruded polymeric article.

9. The coextruded polymeric article of claim 6, wherein the projections are generally parallel to each other and generally perpendicular to the first major surface of the layer.

10. The coextruded polymeric article of claim 6, wherein the projections have an aspect ratio of at least 2 to 1.

11. A coextruded polymeric article comprising a layer comprising first and second opposed major surfaces, wherein a plurality of attached projection pairs comprising first and second projections extend from only the first major surface of the layer, wherein each first projection has at least first and second opposed sides and a height from the first major surface of the layer to a distal end, wherein each second projection has at least first and second opposed sides and a height from the first major surface of the layer to a distal end, wherein for each projection pair the second side of the first projection is in continuous contact with the first side of the second projection and there is a demarcation line between the attached first and second projections of the projection pair.

12. The coextruded polymeric article of claim 11 having a length of at least 5 millimeters.

13. The coextruded polymeric article of claim 12, wherein the projections extend along the length of the coextruded polymeric article.

14. The coextruded polymeric article of claim 11, wherein the projections are generally parallel to each other and generally perpendicular to the first major surface of the layer.

15. The coextruded polymeric article of claim 11, wherein the projections have an aspect ratio of at least 2 to 1.

* * * * *

UNITED STATES PATENT AND TRADEMARK OFFICE
CERTIFICATE OF CORRECTION

| | | |
|---|---|---|
| PATENT NO. | : 12,017,396 B2 | Page 1 of 2 |
| APPLICATION NO. | : 16/970518 | |
| DATED | : June 25, 2024 | |
| INVENTOR(S) | : Ronald Wayne Ausen | |

It is certified that error appears in the above-identified patent and that said Letters Patent is hereby corrected as shown below:

In the Claims

Column 24, Line 52, in Claim 1, cancel the text beginning with "1. A coextruded polymeric article" and ending with "projection pairs per centimeter." in Column 24, Line 62, and insert the following claim:
--1. A coextruded polymeric article comprising a layer comprising first and second opposed major surfaces, wherein a plurality of attached projection pairs comprising first and second projections extend from only the first major surface of the layer, wherein each first projection has at least first and second opposed sides and a height from the first major surface of the layer to a distal end, wherein each second projection has at least first and second opposed sides and a height from the first major surface of the layer to a distal end, wherein for each projection pair the second side of the first projection is in continuous contact with the first side of the second projection, and wherein the height of the first projections is not greater than 2 mm, and wherein there are at least 2.5 projection pairs per centimeter.--.

Column 24, Line 66, in Claim 3, delete "protrusions and" between "the" and "projections".

Column 25, Line 3, in Claim 4, insert --of the layer-- after "first major surface".

Column 25, Line 6, in Claim 6, cancel the text beginning with "6. A coextruded polymeric article" and ending with "projections comprise adhesive." in Column 25, Line 19, and insert the following claim:
--6. A coextruded polymeric article comprising a layer comprising first and second opposed major surfaces, wherein a plurality of attached projection pairs comprising first and second projections extend from only the first major surface of the layer, wherein each first projection has at least first and second opposed sides and a height from the first major surface of the layer to a distal end, wherein each second projection has at least first and second opposed sides and a height from the first major surface to a distal end, wherein for each projection pair the second side of the first projection is in continuous contact with the first side of the second projection, and wherein for the a majority by Signed and Sealed this
Eleventh Day of February, 2025

Coke Morgan Stewart
*Acting Director of the United States Patent and Trademark Office* number of the projection pairs, the height of the second projection is greater than the height of the attached first projection, and wherein at least one of the first or second projections comprise adhesive.--.